(12) United States Patent
Yamada et al.

(10) Patent No.: US 9,729,412 B2
(45) Date of Patent: Aug. 8, 2017

(54) PERIODICITY DETECTION METHOD, PERIODICITY DETECTION DEVICE, AND PERIODICITY DETECTION PROGRAM

(71) Applicant: NEC Corporation, Tokyo (JP)

(72) Inventors: Yoshiyuki Yamada, Tokyo (JP); Makoto Fujinami, Tokyo (JP); Yasuhiro Miyao, Tokyo (JP)

(73) Assignee: NEC CORPORATION, Tokyo (JP)

( * ) Notice: Subject to any disclaimer, the term of this patent is extended or adjusted under 35 U.S.C. 154(b) by 21 days.

(21) Appl. No.: 14/770,882

(22) PCT Filed: Jan. 8, 2014

(86) PCT No.: PCT/JP2014/000037
§ 371 (c)(1),
(2) Date: Aug. 27, 2015

(87) PCT Pub. No.: WO2014/132547
PCT Pub. Date: Sep. 4, 2014

(65) Prior Publication Data
US 2016/0013995 A1   Jan. 14, 2016

(30) Foreign Application Priority Data

Feb. 28, 2013   (JP) .................................. 2013-038677

(51) Int. Cl.
*H04L 12/26*   (2006.01)

(52) U.S. Cl.
CPC .............. *H04L 43/04* (2013.01); *H04L 43/00* (2013.01); *H04L 43/0894* (2013.01); *H04L 43/10* (2013.01)

(58) Field of Classification Search
CPC ......... H04L 43/04; H04L 43/00; H04L 43/10; H04L 43/0894
See application file for complete search history.

(56) References Cited

U.S. PATENT DOCUMENTS 5,636,128 A * 6/1997 Sugimoto .......... G06K 9/00523
702/70
7,490,107 B2 * 2/2009 Kashino ............ G06F 17/30026
(Continued)

FOREIGN PATENT DOCUMENTS

JP    H 07-092975 A    4/1995
JP    2006-013612 A    1/2006
(Continued)

OTHER PUBLICATIONS

International Search Report (ISR) (PCT Form PCT/ISA/210), in PCT/JP2014/000037, dated Feb. 10, 2014.
(Continued)

*Primary Examiner* — Albert T Chou
(74) *Attorney, Agent, or Firm* — McGinn IP Law Group, PLLC

(57) ABSTRACT

An index calculation unit calculates a periodicity determination index for determining the presence of periodicity on the basis of the differential between each segment of the frequency distribution of input numerical data and a frequency distribution in accordance with a baseline distribution provided ahead of time. A determination unit uses the periodicity determination index calculated by the index calculation unit to determine the presence of periodicity including one or more periodic components present in the numerical data.

13 Claims, 16 Drawing Sheets

(56) References Cited

U.S. PATENT DOCUMENTS

2011/0015931 A1* 1/2011 Kawahara ............... G10L 21/00
   704/264
2014/0126840 A1* 5/2014 Nakamura ............ G06T 3/4007
   382/300

FOREIGN PATENT DOCUMENTS

JP    2010-122996 A    6/2010
JP    2010-283668 A    12/2010

OTHER PUBLICATIONS

F. Qian, Z. Wang, Y. Gao, J. Huang, A. Gerber, Z. M. Mao, S. Sen, O. Spatscheck, "Periodic Transfers in Mobile Applications: Network-wide Origin, Impact and Optimization," in Proceedings of the 21st international conference on World Wide Web, pp. 51-60, Apr. 16-20, 2012.
English Translation of Form PCT/ISA/237.

* cited by examiner

PERIODICITY DETECTION METHOD, PERIODICITY DETECTION DEVICE, AND PERIODICITY DETECTION PROGRAM

TECHNICAL FIELD

The present invention relates to a periodicity detection method, a periodicity detection device, a packet monitor system, and a periodicity detection program which detects periodicity present in numerical data of an arbitrary format.

BACKGROUND ART

In various areas such as information processing and information communication, as one of the means for analyzing the characteristics of numerical data, a method for detecting the periodicity that exists in numerical data is required. The "periodicity" present in numerical data means a state in which a repeat of a certain numerical pattern is found in a numerical data series.

FIG. 17 is a diagram illustrating an example of a repeat of numerical pattern. Numerical data to be processed includes, for example, data indicative of a periodical time interval, and data indicative of a periodical position interval such as distance and length, as shown in FIG. 17.

Generally, when detecting periodicity present in numerical data, the detection may be achieved without using any information about periodicity present in the numerical data. A periodic component of which the periodic pattern is composed may include randomness or small fluctuations as shown in FIG. 17. Here, the "periodic component" is an element of the numerical data of which a repeating pattern with periodicity is composed.

An example of a device or a technique for detecting such periodicity of the numerical data is disclosed in patent literature 1 and non-patent literature 1. In patent literature 1 discloses a periodicity detection device which defines an n dimensional phase space to continuous n numerical data, and detects the periodic pattern by extracting a feature point corresponding to the periodic component in the space.

The periodicity detection device described in patent literature 1 records an appearance frequency of the numerical data in a coordinate position in the n dimensional phase space determined by the numerical data, and extracts a coordinate position whose appearance frequency is high as a feature point indicating the periodic component. When the periodicity of a specific repeating pattern exists in the numerical data, with respect to the periodic component of which the periodic pattern is composed, a pattern, which starts from a feature point corresponding to a first periodic component in the n dimensional phase space and ends at a feature point corresponding to the last periodic component via one or a plurality of coordinate positions extracted as the feature point, is detected.

At this time, the feature point corresponding to the first periodic component and the feature point corresponding to the last periodic component are located at the same position in the n dimensional phase space, and a trajectory of the feature points forms a closed loop. When the first feature point and the last feature point are located at the same position in the closed loop, this means that the same numerical data elements appear. Therefore, this result may be considered as the periodicity. The periodicity detection device described in patent literature 1 detects the periodic pattern in the numerical data by utilizing the above-mentioned characteristic.

In a periodicity detection method described in non-patent literature 1, a real number axis is evenly divided according to a predetermined value with respect to numerical data represented by a real number, and each section is defined as a slot. After that, it is determined whether or not the numerical data to be processed exists in each slot and a flag is given to the slot to which it is determined that the numerical data exists. The periodic component is identified by searching for the interval of the slot to which the flag is given and the periodic pattern is detected.

Specifically, in the periodicity detection method described in non-patent literature 1, the search is performed for all the possible slot interval in all the slots. For example, the search is performed for one slot interval, two slot intervals, . . . , and n slot intervals. When there are N slots in the real number axis, the number of candidates for the slot interval is equal to N/2 and the search is performed for all the candidates.

CITATION LIST

Patent Literature

[PTL 1] Japanese Patent Application Laid-Open No. 1995-92975

Non Patent Literature

[NPL 1] F. Qian, Z. Wang, Y. Gao, J. Huang, A. Gerber, Z. M. Mao, S. Sen, O. Spatscheck, "Periodic Transfers in Mobile Applications: Network-wide Origin, Impact and Optimization," in Proceedings of the 21st international conference on World Wide Web, pp. 51-60, 16-20 Apr. 2012.

SUMMARY OF INVENTION

Technical Problem

The object of the periodicity detection method described in patent literature 1 and non-patent literature 1 is to identify the repeating pattern included in the numerical data as the periodic pattern indicative of the periodicity. On the other hand, when a plurality of data sets are given and the data sets are classified into two groups: the data in which periodicity exists and the data in which no periodicity exists, a device only for determining "whether or not the input numerical data has the periodicity" may be needed.

The periodicity detection method described in patent literature 1 and non-patent literature 1 can be used as a method for determining whether or not the input numerical data has the periodicity. For example, the presence or absence of periodicity can be determined as follows: when the periodic pattern is identified, it is determined that the periodicity exists in the input numerical data and when the periodic pattern is not identified, it is determined that the periodicity does not exist in the input numerical data.

As described above, the periodicity detection device described in the patent literature 1 evaluates the appearance frequency of the coordinate position determined by the numerical data in the n dimensional phase space defined to the continuous n numerical data. By this evaluation, the feature point corresponding to the periodic component is extracted and the periodic pattern in the numerical data is detected on the basis of this feature point.

The extracting of the feature point is the process which requires a large amount of calculation, since it is necessary to identify the coordinate position in the n dimensional phase space and to update an evaluation value held to the coordinate position. However, when the periodicity detection device described in patent literature 1 is applied to a device for determining the presence or absence of the periodicity, in order to only determine "whether or not the input numerical data has the periodicity", a process for identifying the coordinate positions in the n dimensional phase space is performed. This process causes a problem of executing a large amount of calculation.

In addition, as described above, the periodicity detection method described in non-patent literature 1 detects the periodic pattern by dividing the real number axis into the sections with equal intervals called a slot according to a predetermined value and identifying the periodic component by searching the interval of the slot in which the numerical data exists. In the periodicity detection method described in non-patent literature 1, a search is performed for all the possible slot interval. Therefore, the number of candidates for the slot interval to be searched for increases according to the number of slots defined on the real number axis.

For example, in a case in which there are N slots on the real number axis and it is determined that the periodicity exists when the same numerical value appear two or more times continuously, the number of candidates for the slot interval is equal to N/2 and the process has to be repeated at least N/2 times. Therefore, it causes an increase in the calculation amount. When the periodicity detection method described in non-patent literature 1 is applied to the device for determining the presence or absence of the periodicity, in order to only determine "whether or not the input numerical data has the periodicity", an iterative process is repeated at least N/2 times and the process causes a problem of increasing the calculation amount.

Accordingly, an object of the present invention is to provide a periodicity detection method, a periodicity detection device, a packet monitor system, and a periodicity detection program which can detect a presence or absence of periodicity in numerical data without increasing the calculation amount.

Solution to Problem

A periodicity detection method according to the present invention includes calculating a periodicity determination index for determining a presence or absence of periodicity on the basis of a difference between a frequency distribution of input numerical data and a frequency distribution in accordance with a predetermined standard distribution in each section; and determining the presence or absence of the periodicity including one or more periodical components present in the numerical data using the calculated periodicity determination index.

The periodicity detection device of the present invention includes an index calculation unit which calculates a periodicity determination index for determining a presence or absence of periodicity on the basis of a difference between a frequency distribution of input numerical data and a frequency distribution in accordance with a predetermined standard distribution in each section, and a determination unit which determines the presence or absence of the periodicity including one or more periodical components present in the numerical data using the periodicity determination index calculated by the index calculation unit.

A packet monitor system according to the present invention includes a numerical data generation unit which extracts packet data to be detected from packet data enumerated in chronological order and generates numerical data indicative of a time interval between temporally consecutive packet data, and a periodicity detection device which detects a presence or absence of periodicity in the numerical data. The periodicity detection device includes an index calculation unit which calculates a periodicity determination index for determining the presence or absence of the periodicity on the basis of a difference between a frequency distribution of the numerical data and a frequency distribution in accordance with a predetermined standard distribution in each section, and a determination unit which determines the presence or absence of the periodicity including one or more periodical components present in the numerical data using the periodicity determination index calculated by the index calculation unit.

A periodicity detection program according to the present invention causes a computer to perform an index calculation process which calculates a periodicity determination index for determining a presence or absence of periodicity on the basis of a difference between a frequency distribution of input numerical data and a frequency distribution in accordance with a predetermined standard distribution in each section, and a determination process which determines the presence or absence of the periodicity including one or more periodical components present in the numerical data using the periodicity determination index calculated in the index calculation process.

Advantageous Effects of Invention

According to the present invention, a presence or absence of periodicity in numerical data can be detected without increasing the calculation amount.

BRIEF DESCRIPTION OF DRAWINGS

FIG. 2 is an explanatory diagram showing an example of numerical data.

DESCRIPTION OF EMBODIMENTS

Exemplary embodiments of the present invention will be described in detail below with reference to the drawings.

Exemplary Embodiment 1

Figure 1:
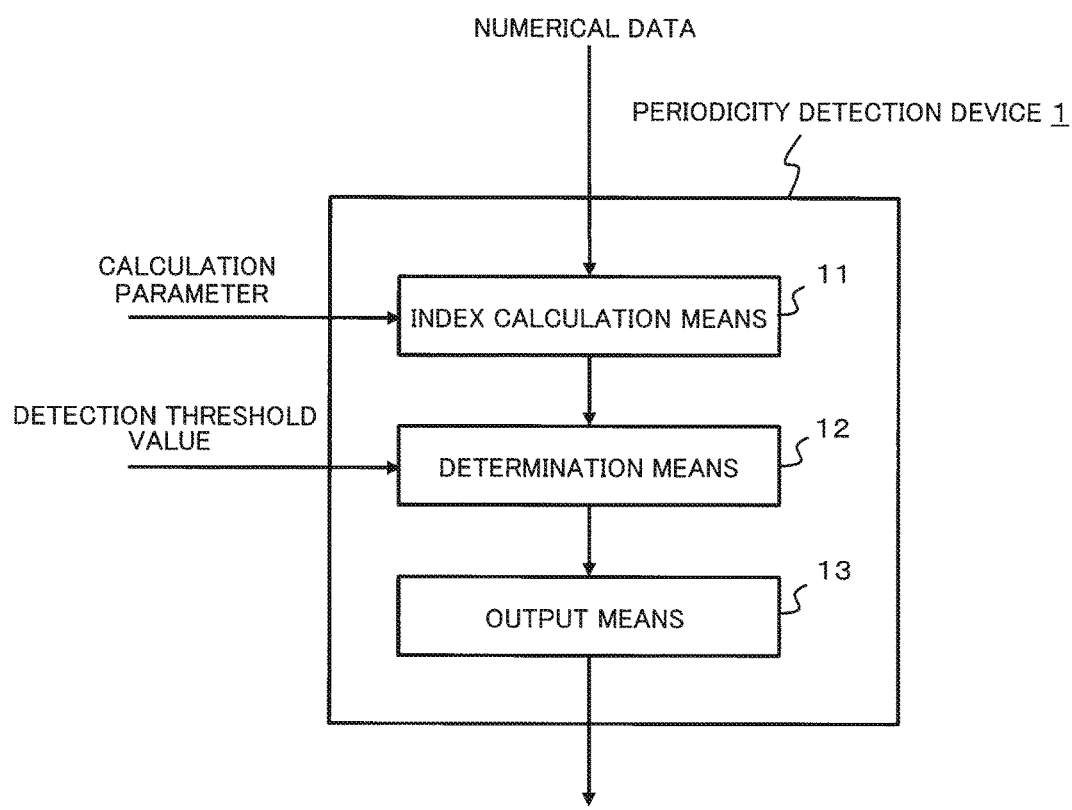
FIG. 1 is a block diagram showing an example of configuration of a first exemplary embodiment of a periodicity detection device according to the present invention.

FIG. 1 is a block diagram showing an example of configuration of a first exemplary embodiment of a periodicity detection device according to the present invention. A periodicity detection device 1 according to the exemplary embodiment includes an index calculation unit 11, a determination unit 12, and an output unit 13. The index calculation unit 11 is connected to the determination unit 12, the determination unit 12 is connected to the index calculation unit 11 and the output unit 13, and the output unit 13 is connected to the determination unit 12.

Figure 2:
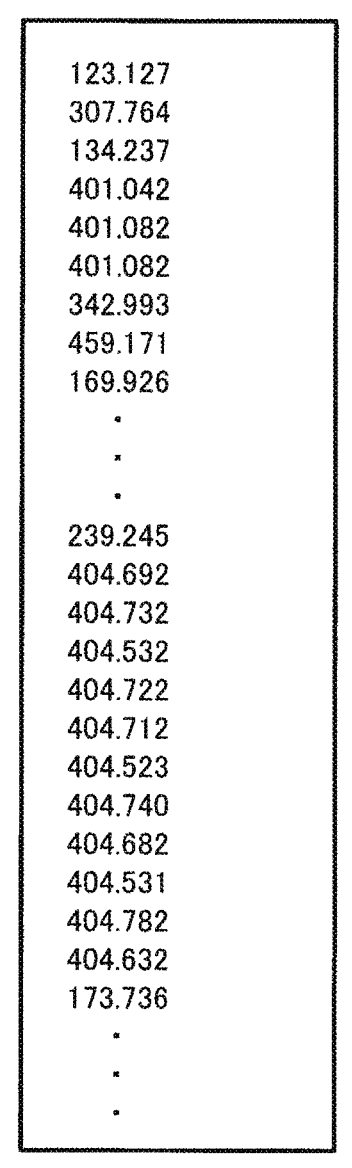

FIG. 2 is an explanatory diagram showing an example of numerical data. The periodicity detection device 1 detects whether or not numerical data, such as shown in FIG. 2, has the periodicity.

The index calculation unit 11 receives the numerical data in which numerical values are enumerated such as shown in FIG. 2 from an external device (not shown). Further, the index calculation unit 11 receives a calculation parameter for calculating a periodicity determination index that is composed of at least a class interval width of the frequency distribution and a predetermined standard distribution from the external device (not shown). The index calculation unit 11 compares the relative frequency distribution of the input numerical data with the relative frequency distribution in accordance with the predetermined standard distribution, calculates an index for determining the presence or absence of the periodicity on the basis of the difference between the frequency distributions in each section, and outputs the calculated index to the determination unit 12.

A distribution expected with respect to the input numerical data is set as the predetermined standard distribution. For example, a uniform distribution or an exponential distribution that is a probability distribution may be applied as the standard distribution. Alternatively, the distribution that is arbitrarily determined by a user may be applied as the standard distribution.

When an ideal distribution of the input numerical data is well-known, it is desirable to set the distribution of the numerical data in a case where ideal numerical data is input to the predetermined standard distribution. However, for example, a different data set acquired in the past may simply be applied. Therefore, the standard distribution is not necessarily limited to the ideal numerical data expected by the user.

Figure 3:
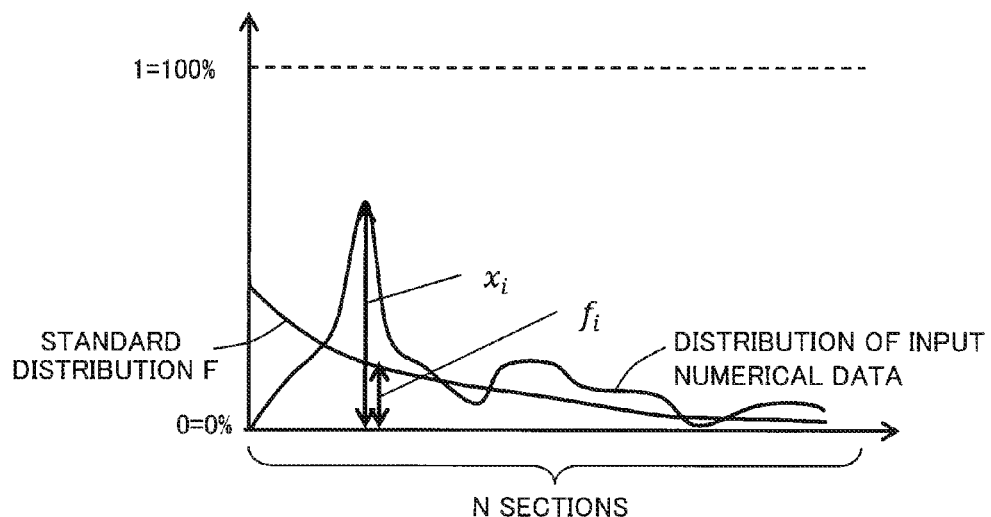
FIG. 3 is an explanatory diagram showing an example of a method for calculating an index.

FIG. 3 is an explanatory diagram showing an example of a method for calculating the index. As shown in FIG. 3 as an example, the index calculation unit 11 may calculate the index by dividing the maximum value of the difference between the input numerical data and the relative frequency distribution in accordance with the predetermined standard distribution obtained with respect to each section by the sum of the differences throughout the entire relative frequency distribution. However, the method for calculating the index is not limited to the method shown in FIG. 3.

The determination unit 12 receives the index calculated for determining the presence or absence of the periodicity from the index calculation unit 11. Further, the determination unit 12 receives an input of a predetermined detection threshold that is a reference for determining the presence or absence of the periodicity from the external device (not shown). The determination unit 12 determines whether or not the input numerical data has the periodicity including one or a plurality of the periodic components by comparing the received index with the detection threshold, and outputs a determination result to the output unit 13.

Figure 17:
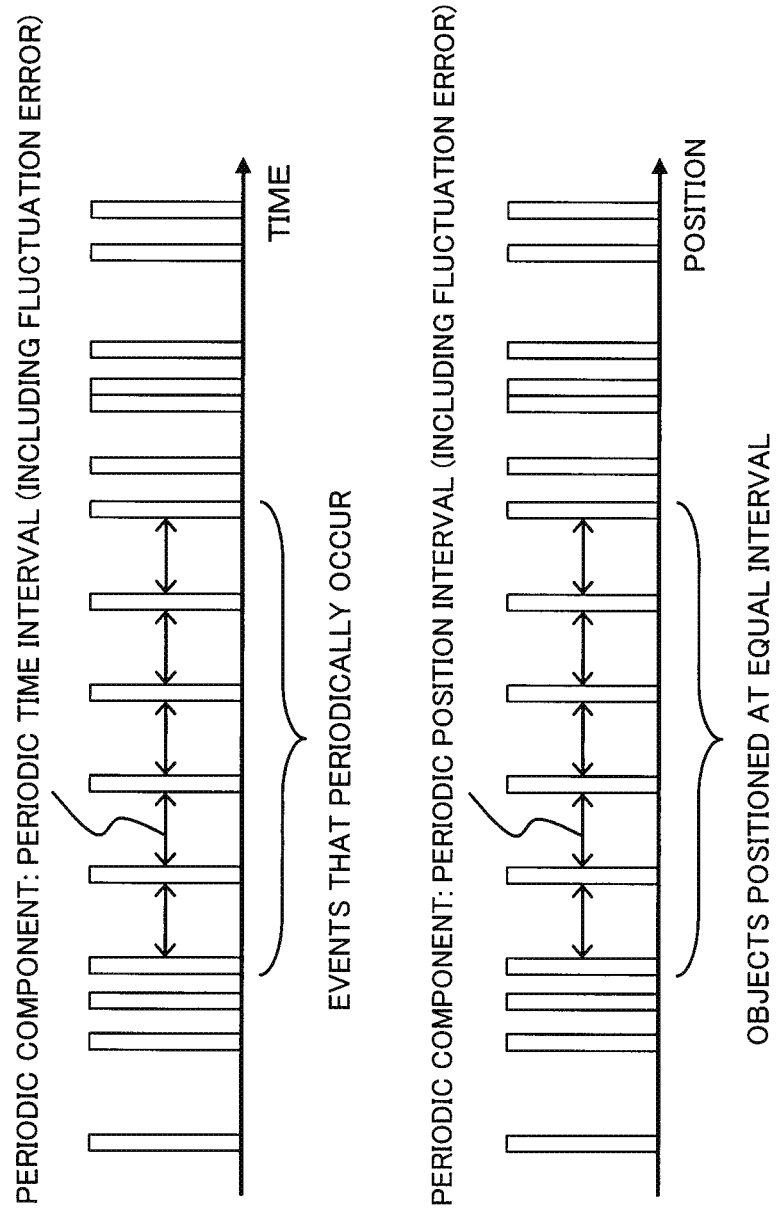
FIG. 17 is an explanatory diagram showing an example of a state in which a series of numerical values is repeatedly found in numerical data as a repeating pattern.

As mentioned above, the "periodic component" is an element of the numerical data of which the repeating pattern with periodicity is composed. The periodic component of which the periodic pattern is composed may include randomness or small fluctuations as shown in FIG. 17.

The detection threshold is arbitrarily set. For example, when an index calculated by a definition formula shown in FIG. 3 as an example is applied, the denominator $\Sigma iDGi$ is equal to zero if two relative frequency distributions are completely equal to each other and the denominator $\Sigma iDGi$ is equal to 2 if two relative frequency distributions are completely different from each other. Therefore, a range of the value of the denominator is neither less than 0, nor greater than 2. On the other hand, the maximum value of the numerator of maxiDGi is 1, since the numerator of maxiDGi is a difference in a section i. Accordingly, a range of the value of the index calculated by the definition formula shown in FIG. 3 as an example is neither less than 0, nor greater than 0.5.

Therefore, the user may apply an arbitrary value in this range. The determination unit 12 determines that the periodicity exists when the calculated index is equal to or greater than the threshold and the periodicity does not exist when the calculated index is equal to or less than the threshold. However, the specific value of the detection threshold is not limited to the value in the above-mentioned range. The user may set the detection threshold according to the method for calculating the index applied to the index calculation unit 11.

The output unit 13 outputs information indicating whether or not the input numerical data has the periodicity to the external device (not shown) according to the determination of the determination unit 12 that indicates whether or not the input numerical data has the periodicity.

The index calculation unit 11, the determination unit 12, and the output unit 13 are realized by a CPU (Central Processing Unit) of a computer which operates according to a program (a periodicity detection program). For example, the program is stored in a storage unit(not shown) of the periodicity detection device 1. The CPU may read the program and operate as the index calculation unit 11, the determination unit 12, and the output unit 13 according to the program. The index calculation unit 11, the determination unit 12, and the output unit 13 may be realized by individual dedicated hardware.

Figure 4:
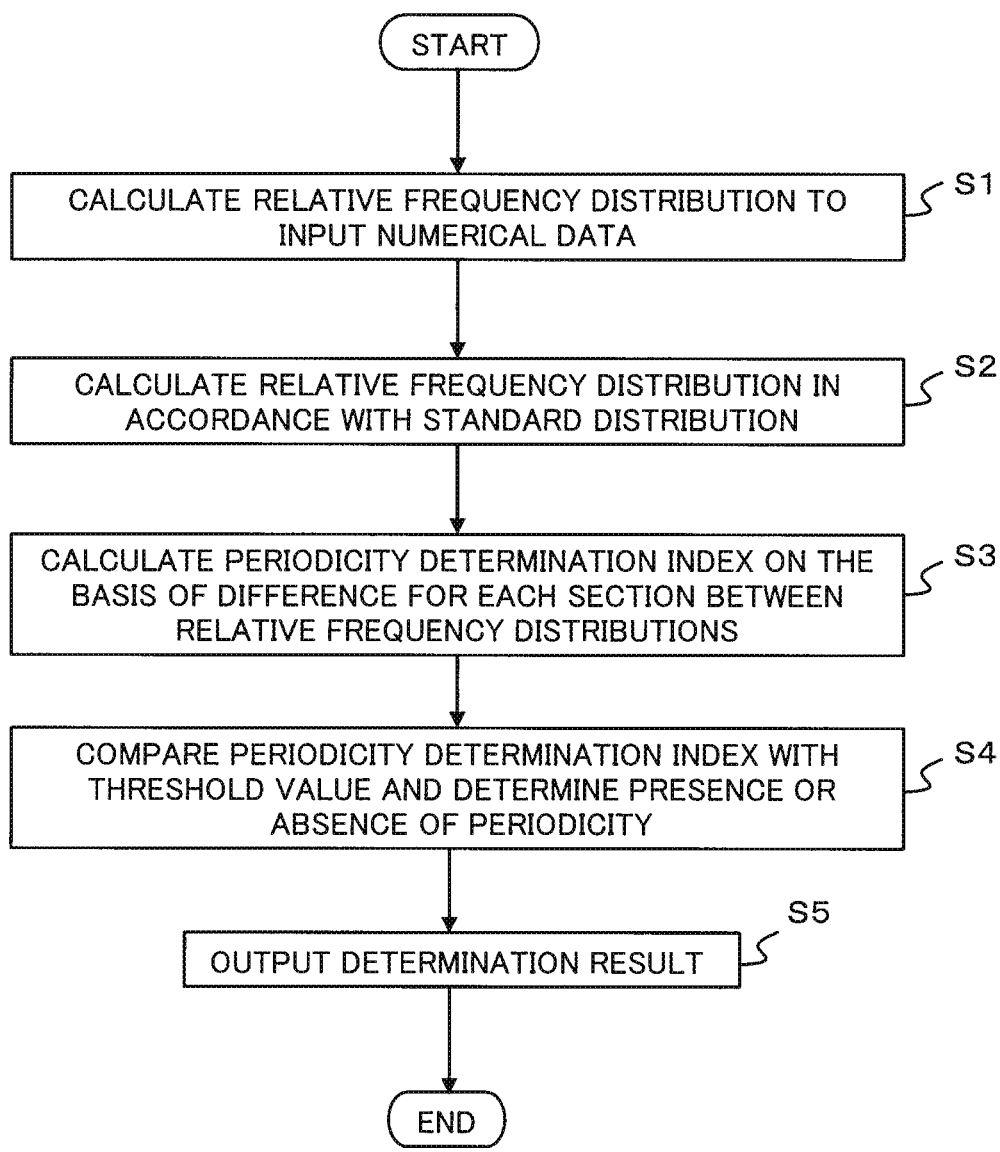
FIG. 4 is a flowchart showing an example of operation of a periodicity detection device 1 according to a first exemplary embodiment.

Next, the operation of the periodicity detection device 1 according to the exemplary embodiment will be described. FIG. 4 is a flowchart showing an example of the operation of the periodicity detection device 1 according to the exemplary embodiment. The index calculation unit 11 receives an input of the numerical data from the external device (not shown). Further, the index calculation unit 11 receives a calculation parameter for calculating the periodicity determination index that is composed of at least the class interval width of the frequency distribution and the predetermined standard distribution from the external device (not shown). The index calculation unit 11 calculates the relative frequency distribution of the input numerical data (step S1).

The index calculation unit 11 refers to the predetermined standard distribution included in the received calculation parameter and calculates the relative frequency distribution in accordance with the standard distribution (step S2). Next, the index calculation unit 11 compares the relative frequency distribution of the input numerical data with the relative frequency distribution in accordance with the predetermined standard distribution, and calculates the periodicity determination index for determining the presence or absence of the periodicity on the basis of the difference between the relative frequency distributions in each section. The index calculation unit 11 outputs the calculated periodicity determination index to the determination unit 12 (step S3).

The determination unit 12 receives the calculated periodicity determination index from the index calculation unit 11 and an input of the predetermined detection threshold that is a standard for determining the presence or absence of the periodicity from the external device (not shown). The determination unit 12 compares the periodicity determination index with the detection threshold, determines whether or not the input numerical data has the periodicity, and notifies the output unit 13 of the determination result (step S4).

The output unit 13 receives the determination result of the presence or absence of the periodicity from the determination unit 12 and outputs the received determination result to the external device (not shown) (step S5).

As described above, in the exemplary embodiment, the index calculation unit 11 calculate the periodicity determination index on the basis of the difference between the frequency distribution of the input numerical data in each section, and the frequency distribution in accordance with the predetermined standard distribution and the determination unit 12 determines the presence or absence of the periodicity by using the periodicity determination index. Specifically, for example, in an example shown in FIG. 3, the index is calculated from the maximum value (a part shown by arrows xi and fi in FIG. 3) of the difference between two relative frequency distributions, which are a standard distribution F and the distribution of the input numerical data, and the index exceeds the detection threshold. Therefore, the presence or absence of the periodicity can be detected. Accordingly, it can be detected whether or not the numerical data has the periodicity without increasing a calculation amount.

Namely, in the exemplary embodiment, since the index calculation unit 11 calculates the index on the basis of the difference between the relative frequency distribution of the input numerical data and the relative frequency distribution in accordance with the predetermined standard distribution in each section, the determination unit 12 is able to determine whether or not the input numerical data has the periodicity. The calculation process performed by the index calculation unit 11 is based on the frequency distribution, which corresponds to identification of a coordinate position in the one-dimensional space. Further, in the calculation process performed by the index calculation unit 11, the index can be calculated by referring to each element of the input numerical data only one time. Therefore, it is not necessary to perform the iterative process. As a result, the periodicity detection device 1 can reduce a calculation amount for determining whether or not the input numerical data having randomness or a variation has the periodicity.

In the periodicity detection device 1, the determination unit 12 compares the periodicity determination index received from the index calculation unit 11 with the detection threshold input from the outside and determines whether or not the input numerical data has the periodicity. As a result, by changing the input detection threshold, sensitivity for detecting the presence or absence of the periodicity can be adjusted. Therefore, the performance of the periodicity detection device 1 can be easily adjusted.

Exemplary Embodiment 2

Figure 5:
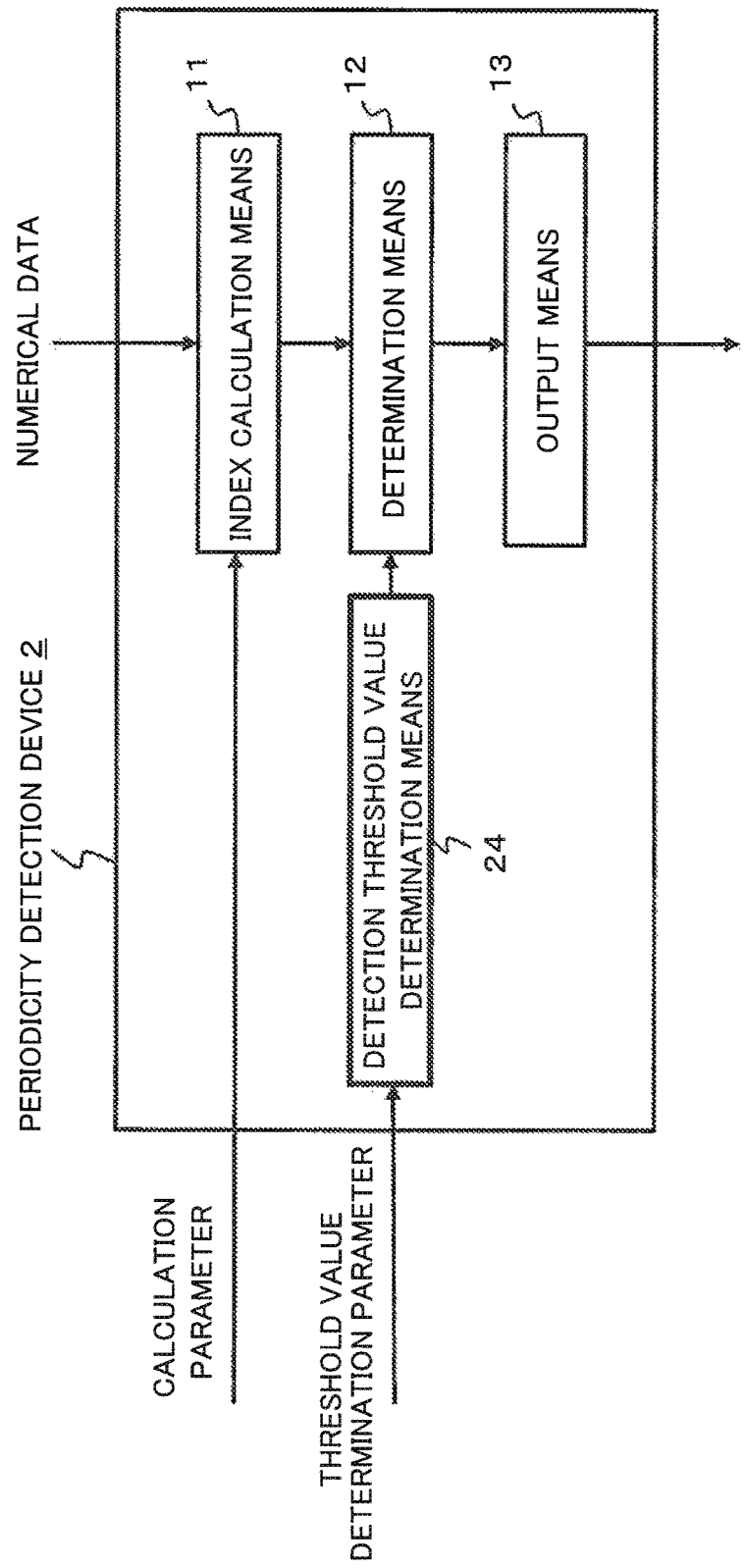
FIG. 5 is a block diagram showing an example of configuration of a second exemplary embodiment of a periodicity detection device according to the present invention.

FIG. 5 is a block diagram showing an example of configuration of a second exemplary embodiment of a periodicity detection device according to the present invention. The same reference numbers are used for the elements having the same function as the first exemplary embodiment shown in FIG. 1 and the description of the element is omitted. A periodicity detection device 2 according to the exemplary embodiment includes the index calculation unit 11, the determination unit 12, the output unit 13, and a detection threshold determination unit 24.

The detection threshold determination unit 24 is connected to the determination unit 12 and receives the input of a threshold determination parameter from an input device (not shown). Namely, the difference between the second exemplary embodiment and the first exemplary embodiment is that the periodicity detection device 2 includes the detection threshold determination unit 24. Other components of the second exemplary embodiment are the same as those of the first exemplary embodiment.

The detection threshold determination unit 24 receives a threshold determination parameter from an input device (not shown), determines a detection threshold that is the standard for determining whether or not the input numerical data has the periodicity, and outputs the detection threshold to the determination unit 12. The threshold determination parameter includes at least a standard distribution that is the same as the standard distribution included in the calculation parameter given to the index calculation unit 11 and a predetermined ratio used for the calculation of the detection threshold.

In the detection threshold determination unit 24, an arbitrary method can be used to determine the detection threshold. For example, when the index calculated by the definition formula shown in FIG. 3 as an example is applied, the detection threshold determination unit 24 may determine the detection threshold by using an algorithm by which an arbitrary value in a possible range of the index from 0 to 0.5 can be output.

When receiving a distribution that is the same as the standard distribution used for the calculation of the periodicity determination index as the threshold determination parameter from the input device (not shown), the detection threshold determination unit 24 may synthesize pseudo-numerical data having the periodic component by adding the numerical data indicating one or a plurality of periodic components to the received standard distribution at an arbitrary ratio. By using the pseudo-numerical data instead of the input numerical data, the detection threshold determination unit 24 may calculate the periodicity determination index (hereinafter, it may be described as a "temporary threshold") by using a method that is the same as the method for calculating the periodicity determination index by the index calculation unit 11, and determine the detection threshold by multiplying the calculated temporary threshold by the predetermined ratio.

It is to be noted that the method for determining the detection threshold is not limited to the above-mentioned method. The detection threshold determination unit 24 may determine the detection threshold by using an arbitrary method in which the detection threshold is determined to a value to which it can be determined that there is a high possibility that the periodicity exists in a possible range of the periodicity determination index. The threshold determination parameter may be appropriately changed according to a method for determining the applied detection threshold.

The detection threshold determination unit 24 is also realized by the CPU of the computer which operates according to the program (the periodicity detection program). The detection threshold determination unit 24 may be realized by dedicated hardware.

Figure 6:
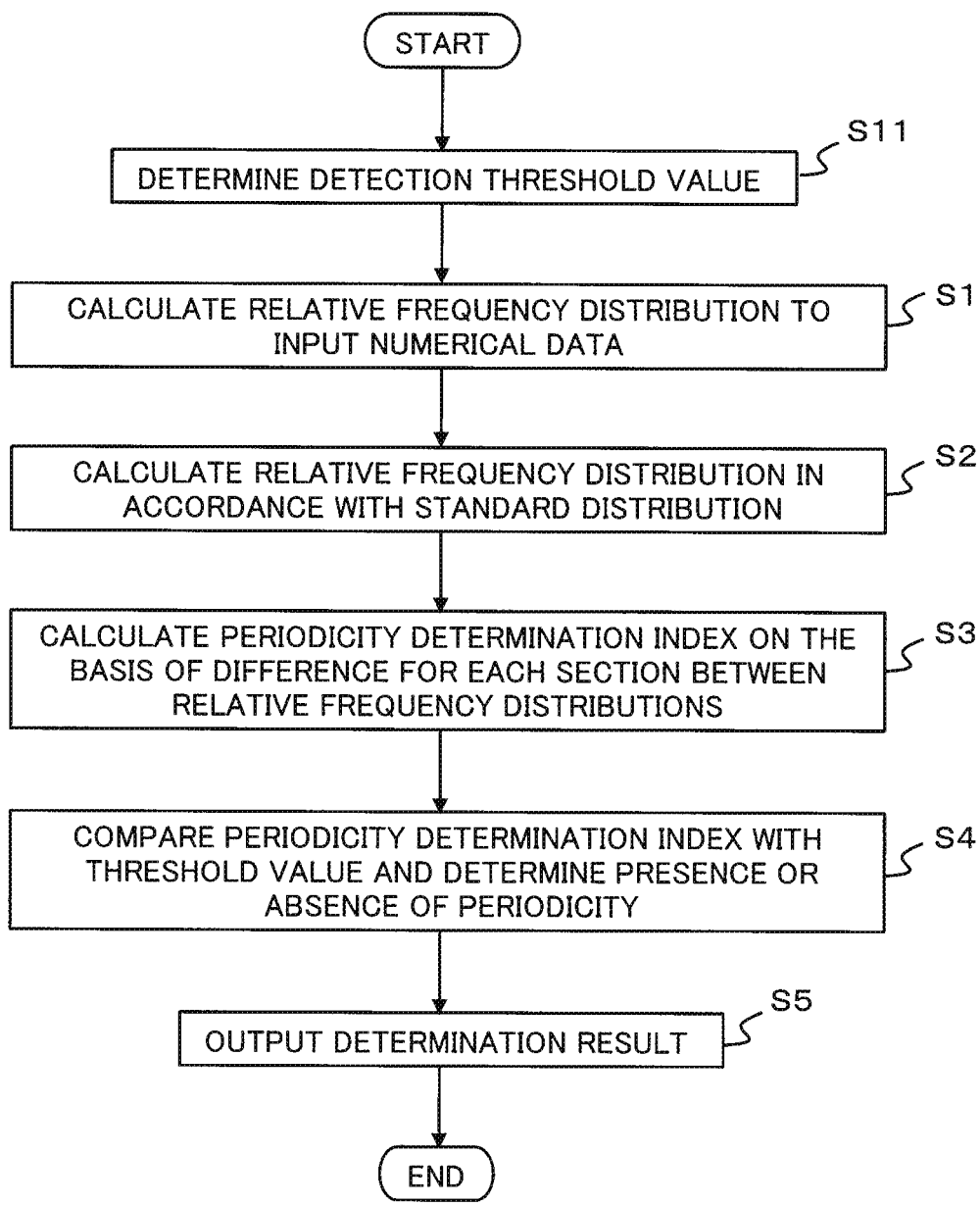
FIG. 6 is a flowchart showing an example of operation of a periodicity detection device 2 according to a second exemplary embodiment.

Next, the operation of the periodicity detection device 2 according to the exemplary embodiment will be described. FIG. 6 is a flowchart showing an example of the operation of the periodicity detection device 2 according to the exemplary embodiment. It is to be noted that the same signs as those shown in FIG. 4 are used for the same operation as the first exemplary embodiment and the detailed description is omitted.

A difference between the periodicity detection device 2 according to the second exemplary embodiment and the periodicity detection device 1 according to the first exemplary embodiment is as follows.

In the exemplary embodiment, first, the detection threshold determination unit 24 receives at least the standard distribution that is the same as the standard distribution received by the index calculation unit 11 and the threshold determination parameter including the predetermined ratio used for the calculation of the threshold from the input device (not shown). The detection threshold determination unit 24 generates the pseudo-numerical data by adding the numerical data indicating one or a plurality of periodic components at an arbitrary ratio. The detection threshold determination unit 24 calculates a tentative index by using the same manner as a manner for calculating the index by the index calculation unit 11 and determines the detection threshold by multiplying the tentative index by the predetermined ratio included in the threshold determination parameter (step S11).

In the exemplary embodiment, the determination unit 12 receives the detection threshold that is the standard for determining the presence or absence of the periodicity from the detection threshold determination unit 24 in step S4. The determination unit 12 determines whether or not the input numerical data has the periodicity by comparing the periodicity determination index calculated by the index calculation unit 11 with the detection threshold, and notifies the output unit 13 of the determination result.

As described above, in the exemplary embodiment, the detection threshold determination unit 24 determines the detection threshold used for determining the presence or absence of the periodicity by the determination unit 12. Specifically, the detection threshold determination unit 24 synthesizes the standard distribution and the numerical data indicating one or a plurality of periodic components and generates the pseudo-numerical data. The detection threshold determination unit 24 calculates the temporary threshold by using the same method as the method for calculating the periodicity determination index by the index calculation unit 11, and determines the detection threshold by multiplying the calculated temporary threshold by the predetermined ratio.

As a result, by only changing the threshold determination parameter such as the standard distribution given as a policy or the predetermined ratio, automatic recalculation of the threshold that is the standard for determining the periodicity becomes available. Therefore, the number of the user's operations required when the standard distribution or the predetermined ratio is changed can be reduced and whereby, the operation cost required for changing the threshold can be reduced. This advantage can be obtained also when the periodicity detection device 2 is applied to a real-time monitoring system.

Exemplary Embodiment 3

Figure 7:
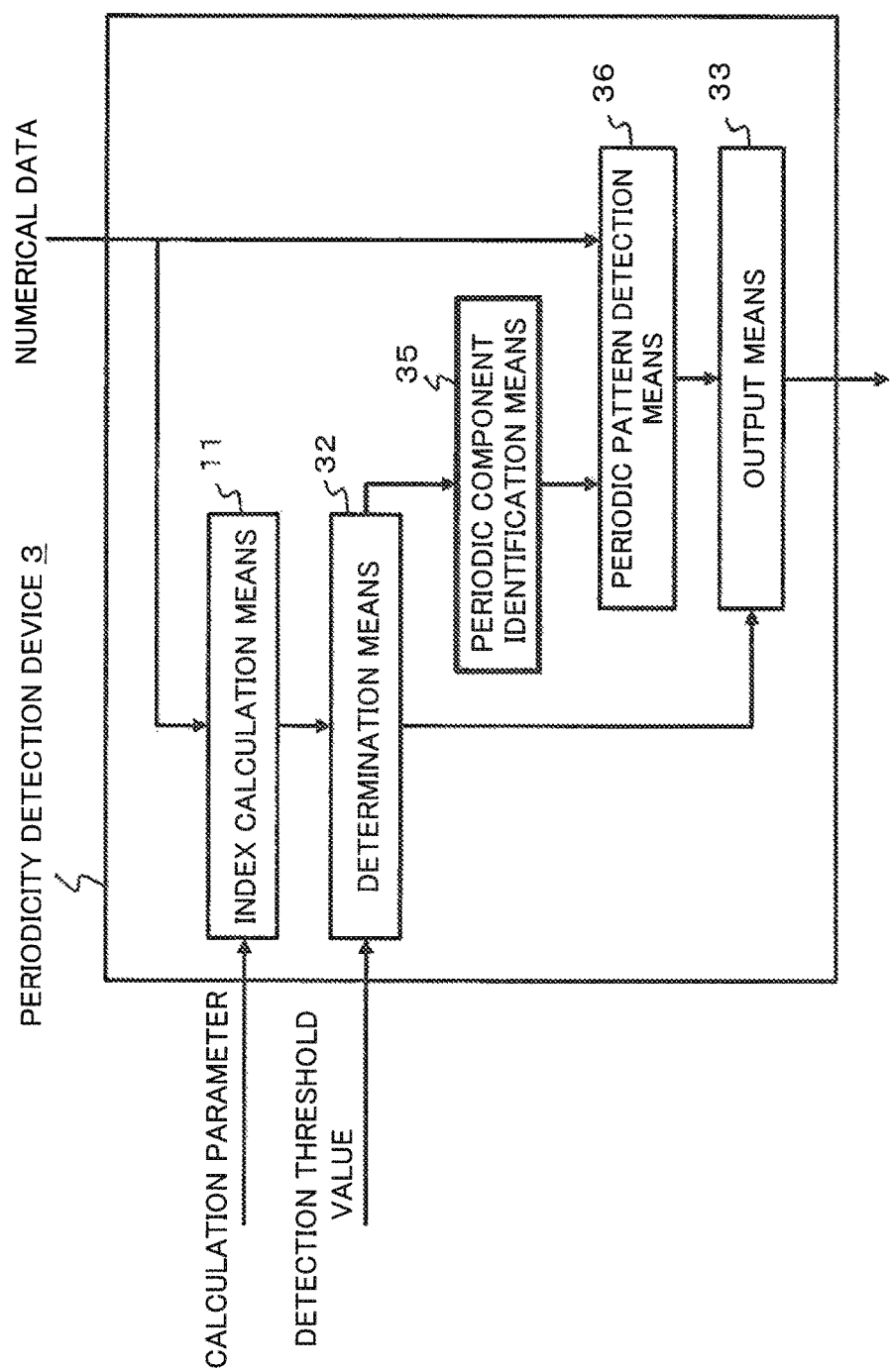
FIG. 7 is a block diagram showing an example of configuration of a third exemplary embodiment of a periodicity detection device according to the present invention.

FIG. 7 is a block diagram showing an example of configuration of a third exemplary embodiment of a periodicity detection device according to the present invention. The same reference numbers are used for the elements having the same function as the first exemplary embodiment shown in FIG. 1, and the description of the element is omitted. A periodicity detection device 3 according to the exemplary embodiment includes the index calculation unit 11, a determination unit 32, an output unit 33, a periodic component identification unit 35, and a periodic pattern detection unit 36.

The determination unit 32 is connected to the index calculation unit 11, the output unit 33, and the periodic component identification unit 35 respectively, and receives an input of the detection threshold from the input device (not shown). The output unit 33 is connected to the determination unit 32 and the periodic pattern detection unit 36 respectively. The periodic component identification unit 35 is connected to the determination unit 32 and the periodic pattern detection unit 36 respectively. The periodic pattern detection unit 36 is connected to the periodic component identification unit 35 and the output unit 33 respectively, and receives an input of the numerical data from the external device (not shown).

Namely, in the periodicity detection device 3 according to the third exemplary embodiment, the output unit 33 is used instead of the output unit 13 and the periodic component identification unit 35 and the periodic pattern detection unit 36 are further included. This is a difference between the periodicity detection device 3 according to the third exemplary embodiment and the periodicity detection device 1 according to the first exemplary embodiment. The element other than the above-mentioned elements is the same as that of the first exemplary embodiment.

The determination unit 32 receives the periodicity determination index from the index calculation unit 11 and receives the input of the predetermined detection threshold that is the standard for determining the presence or absence of the periodicity from the external device (not shown). The determination unit 32 compares the periodicity determination index with the detection threshold and determines whether or not the input numerical data has the periodicity including one or a plurality of periodic components. Here, the detection threshold received by the determination unit 32 is similar to the detection threshold received by the determination unit 12.

When the input numerical data has the periodicity, the determination unit 32 outputs information indicating the presence of the periodicity to the periodic component identification unit 35. On the other hand, when the input numerical data does not have the periodicity, the determination unit 32 outputs information indicating the absence of the periodicity to the output unit 33.

When the periodic component identification unit 35 receive the information indicating that the numerical data has the periodicity from the determination unit 32, the periodic component identification unit 35 identifies one or a plurality of periodic components and outputs them to the periodic pattern detection unit 36.

The periodic component identification unit 35 may identify the periodic component by using the index calculated in a process for calculating the periodicity determination index in each section by the index calculation unit 11. Specifically, the index calculation unit 11 compares the relative frequency distribution of the input numerical data with the relative frequency distribution in accordance with the predetermined standard distribution and calculates the difference between these relative frequency distributions for each section.

At this time, the periodic component identification unit 35 may identify one or a plurality of sections in which the calculated difference is greater than the predetermined threshold as the periodic component. Further, the periodic component identification unit 35 may calculate the index for each section by dividing the difference of each section by the sum of the calculated differences in the entire distribution. In this case, the periodic component identification unit 35 may identify one or a plurality of sections which have the index greater than the predetermined threshold as the periodic component.

The detection threshold determined by the detection threshold determination unit 24 according to the second exemplary embodiment may be used for the predetermined threshold used when the periodic component is identified. In this case, the periodicity detection device 3 may include the detection threshold determination unit 24.

It is to be noted that the method for identifying the periodic component is not limited to the above-mentioned method. The periodic component identification unit 35 may identify the periodic component by using a method in which one or a plurality of sections in which appearance frequency is greater than a predetermined frequency are identified as the periodic component by using the frequency distribution of the input numerical data. The periodic component identification unit 35 may identify the section whose frequency is the mode among all the sections as the section including the periodic component.

Further, the periodic component identification unit 35 may compare the relative frequency distribution of the input numerical data with the relative frequency distribution in accordance with the predetermined standard distribution and identify the section in which the difference between the relative frequency distributions of each section is the maximum as the section including the periodic component.

Further, the periodic component identification unit 35 may repeatedly perform a process for calculating the index by the index calculation unit 11 and a process for determining the presence or absence of the periodicity by the determination unit 32 and identify a plurality of periodic components.

Specifically, after the periodic component identification unit 35 identified the section in which the difference is the maximum as the section including the periodic component, the periodic component identification unit 35 may identify the section including the periodic component by generating a new relative frequency distribution with which the difference in the section is made equal to 0, and performing the above-mentioned iterative process by using this relative frequency distribution. At this time, when the periodic component identification unit 35 determines that the periodicity exists, the periodic component identification unit 35 may repeat this process. Further, the generation of the new relative frequency distribution with which the difference in the section is made equal to 0 means the exclusion of the section from the target section which is identified as the periodic component. By repeating such process, a plurality of periodic components can be identified.

The periodic pattern detection unit 36 receives the input of the numerical data from the external device (not shown). Further, the periodic pattern detection unit 36 receives the information about one or a plurality of periodic components that are identified in the input numerical data from the periodic component identification unit 35. The periodic pattern detection unit 36 identifies the periodic pattern including one or a plurality of periodic components that exist in the input numerical data on the basis of the predetermined method and notifies the output unit 33 of the identified periodic pattern.

For example, as the predetermined method for detecting the periodic pattern, the periodic pattern detection unit 36 may use a method in which a part in which the same numerical values appear sequentially is detected as the periodic pattern. However, the method for detecting the periodic pattern is not limited to the above-mentioned method. For example, the periodic pattern detection unit 36 may detect the periodic pattern by using the method described in patent literature 1 or non-patent literature 1. Namely, the periodic pattern detection unit 36 may use an arbitrary algorithm by which the repeating pattern that can be regarded as a periodic pattern can be identified.

When the determination unit 32 determines that the input numerical data does not have the periodicity, the output unit 33 receives information indicating that the numerical data does not have the periodicity from the determination unit 32 and outputs the information to the external device (not shown). When the determination unit 32 determines that the input numerical data has the periodicity, the output unit 33 receives the information indicating the identified periodic pattern from the periodic pattern detection unit 36 and outputs the information to the external device (not shown).

Here, a format of the information indicating the periodic pattern output by the output unit 33 when the input numerical data has the periodicity is not particularly limited. For example, the output unit 33 may output the numerical value itself included in the extracted periodic pattern or may perform the processing of data such as the generation of a histogram in which the number of times of appearances is shown for each periodic pattern or the like and output a result as statistical data.

The index calculation unit 11, the determination unit 32, the output unit 33, the periodic component identification unit 35, and the periodic pattern detection unit 36 are realized by the CPU of the computer which operates according to the program (the periodicity detection program). Further, the index calculation unit 11, the determination unit 32, the output unit 33, the periodic component identification unit 35, and the periodic pattern detection unit 36 may be realized by individual dedicated hardware.

Figure 8:
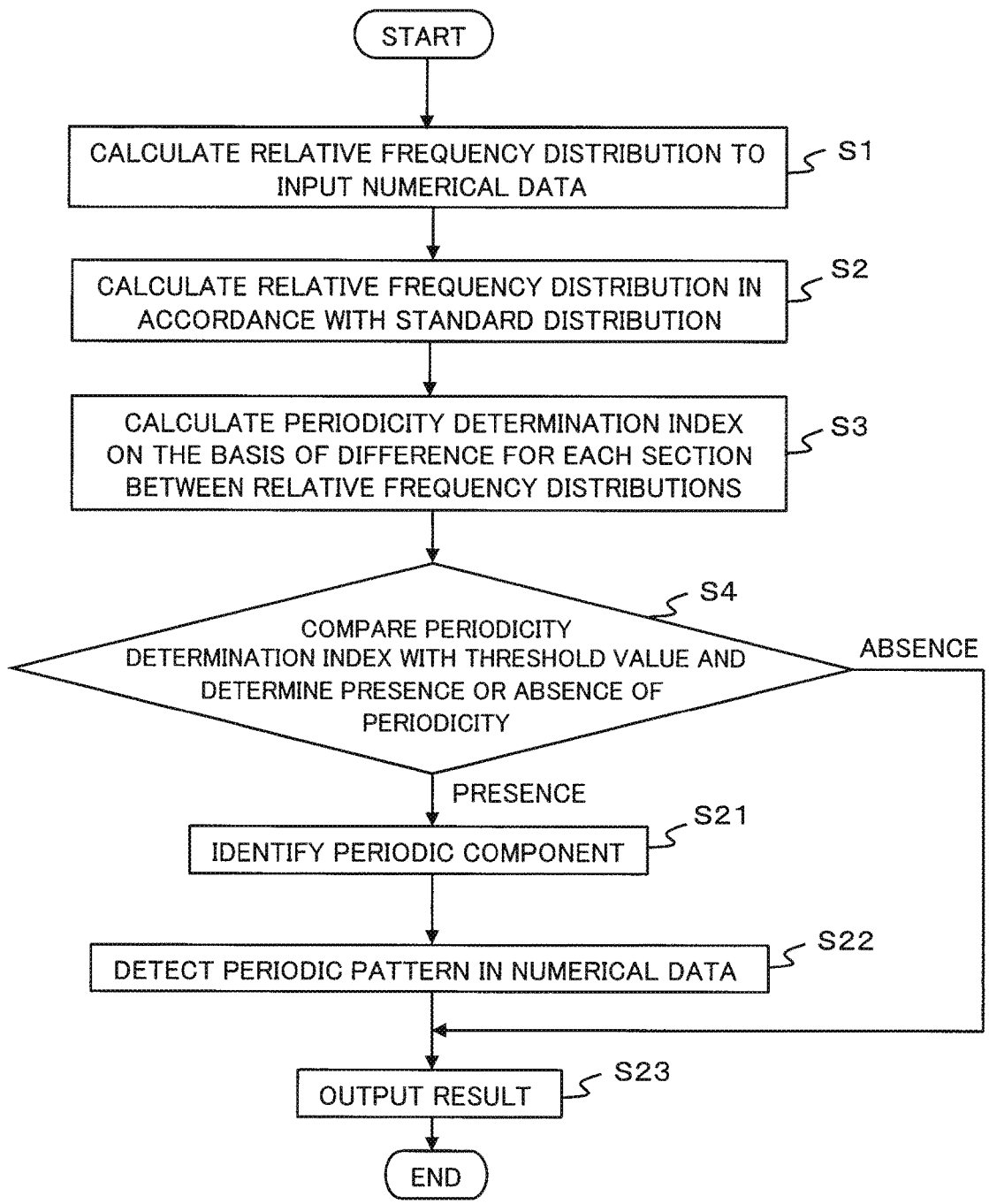
FIG. 8 is a flowchart showing an example of operation of a periodicity detection device 3 according to a third exemplary embodiment.

Next, the operation of the periodicity detection device 3 according to the exemplary embodiment will be described. FIG. 8 is a flowchart showing an example of the operation of the periodicity detection device 3 according to the exemplary embodiment. The same flowchart step numbers are used for the step in which the same operation as the first exemplary embodiment shown in FIG. 4 is performed and the detailed description is omitted.

The processes of steps S1 to S3 in which the periodicity determination index is calculated from the input numerical data, the class interval width of the frequency distribution, and the predetermined standard distribution are the same as the processes performed by the periodicity detection device 1 according to the first exemplary embodiment. On the other hand, the difference between the periodicity detection device 3 according to the third exemplary embodiment and the periodicity detection device 1 according to the first exemplary embodiment will be described below.

In the exemplary embodiment, the determination unit 32 receives the input of the predetermined detection threshold from the external device (not shown), compares the periodicity determination index calculated by the index calculation unit 11 with the detection threshold, and determines whether or not the input numerical data has the periodicity (step S4).

When it is determined that the periodicity exists ("presence" in step S4), the determination unit 32 outputs information indicating that the periodicity exists to the periodic component identification unit 35. On the other hand, when it is determined that the periodicity does not exist ("absence" in step S4), the determination unit 32 outputs information indicating that the periodicity does not exist to the output unit 33.

Next, in the exemplary embodiment, when the periodic component identification unit 35 receives the information indicating that the input numerical data has the periodicity from the determination unit 32, the periodic component identification unit 35 identifies one or a plurality of the periodic components and outputs information indicating the identified periodic component to the periodic pattern detection unit 36 (step S21).

Next, in the exemplary embodiment, the periodic pattern detection unit 36 identifies the repeating pattern that can be regarded as a periodic pattern in the numerical data input from the external device (not shown) on the basis of the information about the periodic component received from the periodic component identification unit 35. The periodic pattern detection unit 36 extracts the repeating pattern as the periodic pattern and notify the output unit 33 of the extracted result (step S22).

Next, in the exemplary embodiment, when the output unit 33 receives the extracted periodic pattern from the periodic pattern detection unit 36, the output unit 33 outputs the extracted period pattern to the external device (not shown). On the other hand, when the output unit 33 receives the information indicating that the input numerical data does not have the periodicity from the determination unit 32, the output unit 33 outputs information indicating that the input numerical data does not have the periodicity to the external device (not shown) (step S23).

As described above, in the exemplary embodiment, the periodic component identification unit 35 identifies the periodic pattern including one or a plurality of the periodic components from the numerical data to which it is determined by the determination unit 32 that the periodicity exists. Specifically, in the periodicity detection device 3 according to the exemplary embodiment, only when the determination unit 32 determines that the input numerical data has the periodicity, the periodic component identification unit 35 identifies one or a plurality of the periodic components included in the input numerical data. At this time, the periodic pattern detection unit 36 identifies the periodic pattern which exists in the input numerical data by the predetermined method.

As a result, the periodicity detection device 3 can detect the periodic pattern in a state in which it is determined whether or not the input numerical data has the periodicity in advance. Therefore, the periodicity detection device 3 does not search for the periodic pattern with respect to the numerical data to which it is determined that the periodicity does not exist and can search for the periodic pattern with respect to only the numerical data to which it is determined that the periodicity exists. Namely, by using the exemplary embodiment, the search range can be reduced by determining the presence or absence of the periodicity in advance.

This exerts the effect in a situation in which a process for detecting the periodicity is repeatedly performed to a plurality of data sets in which the numerical data which has the periodicity and the numerical data which does not have the periodicity are mixed.

For example, even when the method described in patent literature 1 or non-patent literature 1 is used for the predetermined method for detecting the periodic pattern, the amount of calculation performed by the periodic pattern detection unit 36 can be reduced in comparison with a case in which the presence or absence of the periodicity is not determined in advance.

In the periodicity detection device 3 according to the exemplary embodiment, before the periodic pattern detection unit 36 identifies the periodic pattern, the periodic component identification unit 35 identifies the periodic component included in the input numerical data and notifies the periodic pattern detection unit 36 of the information about the identified periodic component As a result, since the periodic pattern can be identified in a state in which the periodic component included in the periodic pattern is determined, the process for detecting the periodic pattern can be simplified and the calculation amount can be reduced.

For example, when the method described in patent literature 1 is applied to the predetermined method for detecting the periodic pattern, the candidate for the coordinate position extracted as the feature point can be narrowed down in advance. For example, when the method described in non-patent literature 1 is applied to the predetermined method for detecting the periodic pattern, since the periodic component corresponds to the slot interval, the number of candidates for the searched slot interval can be reduced. It is expected that the calculation amount can be reduced.

In the periodicity detection device 3 according to the exemplary embodiment, the periodic component identification unit 35 can use the relative frequency distribution that is the same as the relative frequency distribution used when the index calculation unit 11 calculates the periodicity determination index in common. As a result, the calculation process performed by the index calculation unit 11 and the calculation process performed by the periodic component identification unit 35 can be performed at the same time. Therefore, the calculation amount can be reduced.

Exemplary Embodiment 4

Figure 9:
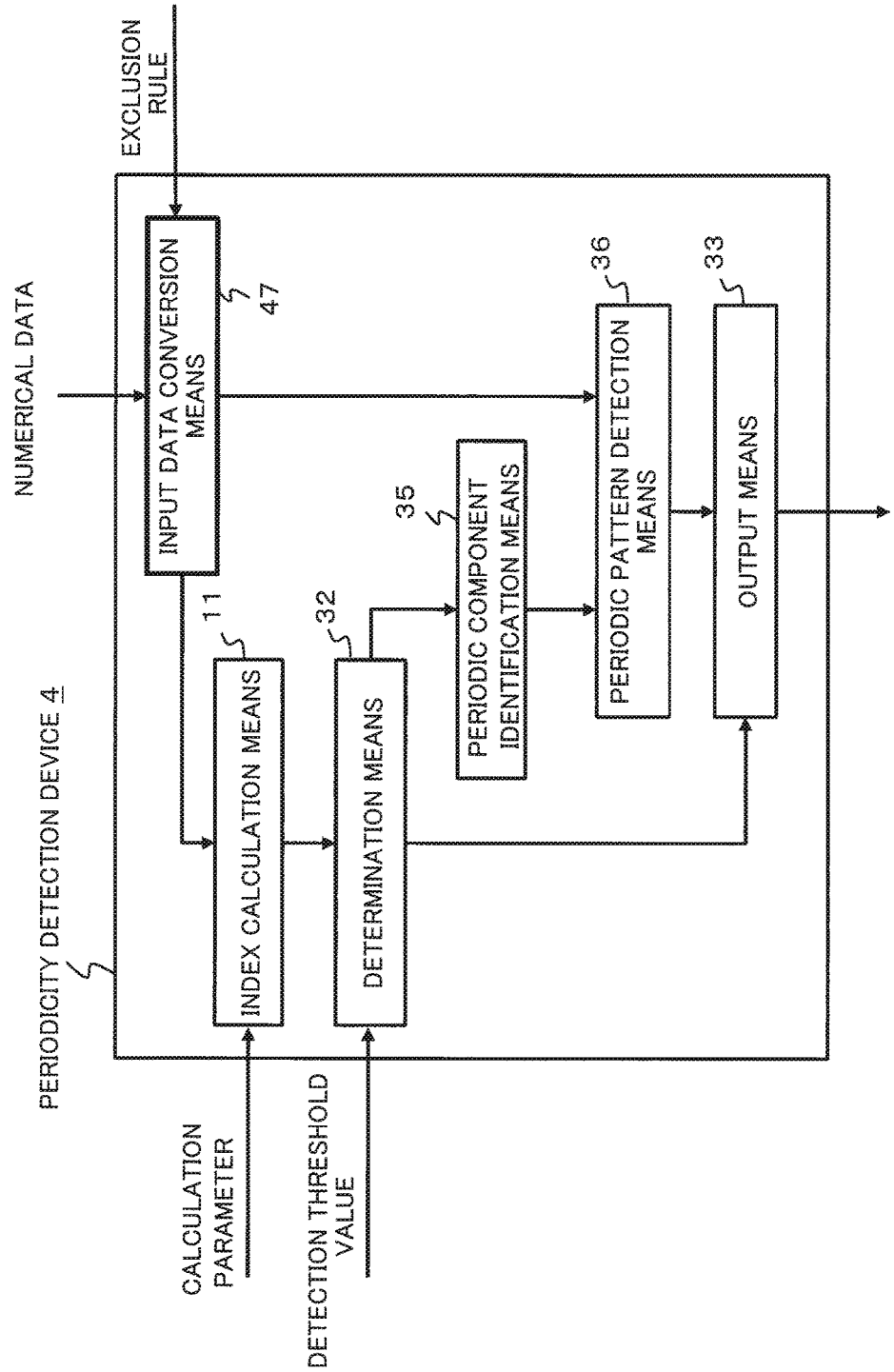
FIG. 9 is a block diagram showing an example of configuration of a forth exemplary embodiment of a periodicity detection device according to the present invention.

FIG. 9 is a block diagram showing an example of configuration of a fourth exemplary embodiment of a periodicity detection device according to the present invention. The same reference numbers are used for the elements having the same function as the third exemplary embodiment shown in FIG. 7 and the description of the element is omitted. A periodicity detection device 4 according to the exemplary embodiment includes the index calculation unit 11, the determination unit 32, the output unit 33, the periodic component identification unit 35, the periodic pattern detection unit 36, and an input data conversion unit 47.

The input data conversion unit 47 is connected to the index calculation unit 11 and the periodic pattern detection unit 36 respectively, and receives the input of the numerical data from the input device (not shown). Namely, in the fourth exemplary embodiment, a periodicity detection method 4 includes the input data conversion unit 47. This is the difference between the fourth exemplary embodiment and the third exemplary embodiment. The element other than the above-mentioned element is the same as that of the third exemplary embodiment.

The input data conversion unit 47 receives the input of the numerical data from the external device (not shown). Further, when the input numerical data includes a numerical value not having to count as the periodic component to be detected, the input data conversion unit 47 receives a predetermined exclusion rule for excluding an element indicating the numerical value from the external device (not shown). The input data conversion unit 47 excludes the element from the input numerical data according to the predetermined exclusion rule and outputs the element of the numerical data that is remaining without being excluded to the index calculation unit 11 and the periodic pattern detection unit 36.

As an example of the exclusion rule, for example, a rule in which all the elements smaller than a predetermined threshold are excluded and the excluded numerical value is added to the element positioned before one can be used. However, the exclusion rule is not limited to such rule. For example, an exclusion rule in which the ignorable numerical value that is not regarded as the periodic component is arbitrarily specified may be used. Further, the exclusion rule in which the numerical value to be excluded is simply excluded may be used.

The input data conversion unit 47 is also realized by the CPU of the computer which operates according to the program (the periodicity detection program). The input data conversion unit 47 may be realized by dedicated hardware.

Figure 10:
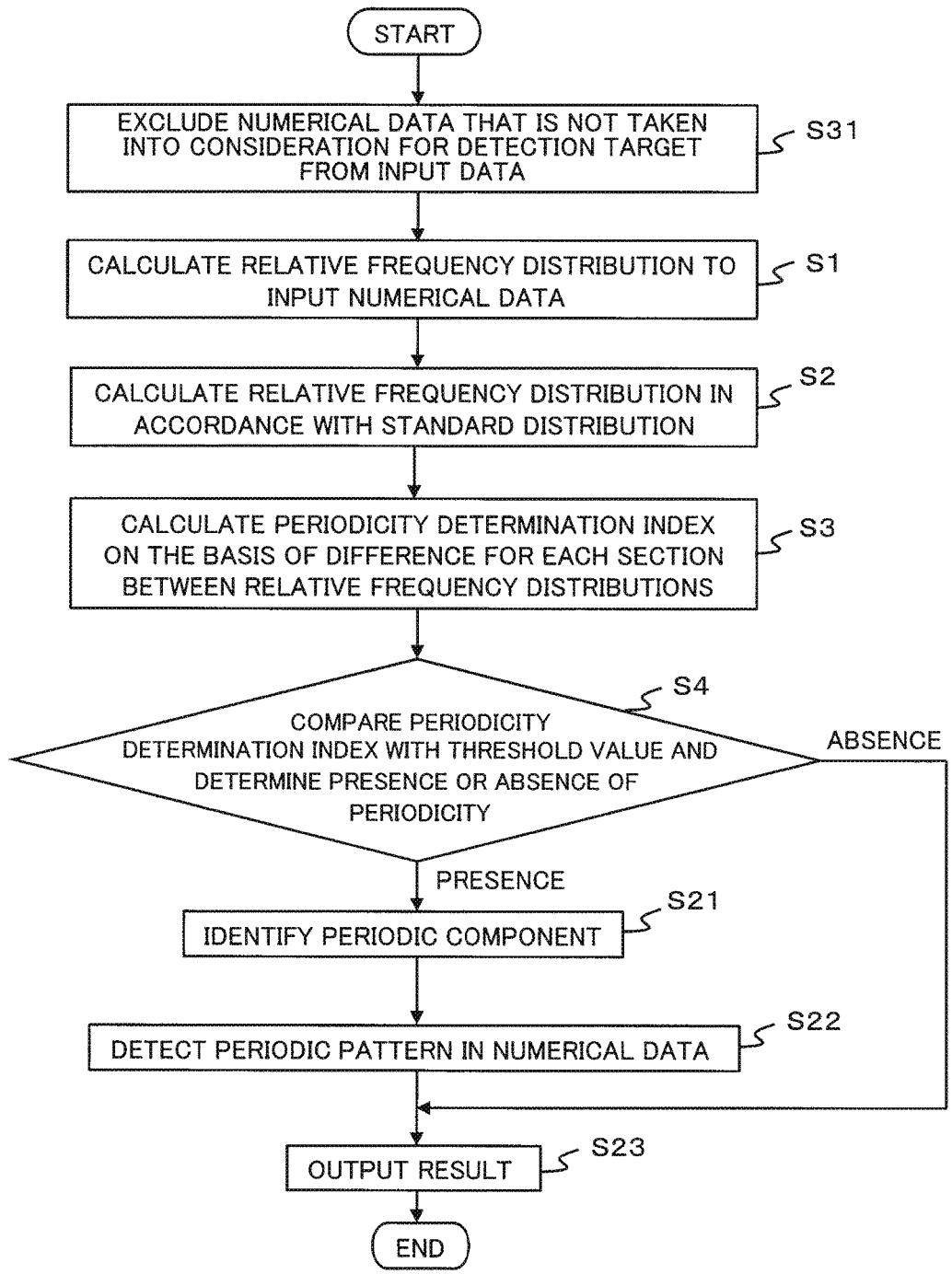
FIG. 10 is a flowchart showing an example of operation of a periodicity detection device 4 according to a fourth exemplary embodiment.

Next, the operation of the periodicity detection device 4 according to the exemplary embodiment will be described. FIG. 10 is a flowchart showing an example of the operation of the periodicity detection device 4 according to the exemplary embodiment. The same flowchart step numbers are used for the step in which the same operation as the third exemplary embodiment shown in FIG. 8 is performed and the detailed description is omitted.

The periodicity detection device 4 according to the fourth exemplary embodiment is different from the periodicity detection device 3 according to the third exemplary embodiment. This difference will be described below.

First, in the exemplary embodiment, the input data conversion unit 47 receives the input of the numerical data from the external device (not shown). Further, the input data conversion unit 47 receives the predetermined exclusion rule to exclude the periodic component not having to count as from the external device (not shown). The input data conversion unit 47 excludes the element from the input numerical data according to the predetermined exclusion rule and outputs the element of the numerical data that is remaining without being excluded to the index calculation unit 11 and the periodic pattern detection unit 36 (step S31).

In the exemplary embodiment, the index calculation unit 11 receives the input of the numerical data from the input data conversion unit 47 and calculates the periodicity determination index in step S1.

In the exemplary embodiment, in step S22, the periodic pattern detection unit 36 receives the numerical data from the input data conversion unit 47 and identifies the repeating pattern that can be regarded as a periodic pattern in the numerical data on the basis of information about the periodic component received from the periodic component identification unit 35. The periodic pattern detection unit 36 extracts the repeating pattern as the periodic pattern and notifies the output unit 33 of the extracted result.

As described above, in the exemplary embodiment, the input data conversion unit 47 excludes, when the numerical value not having to count as the periodic component to be detected is included in the numerical data, the numerical value according to the predetermined exclusion rule.

Specifically, the input data conversion unit 47 generates the numerical data by excluding the element that is the periodic component not having to count as the periodic component to be detected from the input numerical data according to the predetermined exclusion rule and the index calculation unit 11 calculates the periodicity determination index by using this numerical data. The determination unit 32 determines the presence or absence of the periodicity and the periodic pattern detection unit 36 identifies the periodic pattern in the input numerical data. As a result, the data that is regarded as the noise at the time of the detection of the periodicity is more clearly excluded and then, the periodicity can be detected. Therefore, the accuracy of the output periodic pattern can be improved.

For example, when the periodicity of the order of hundred seconds is detected, there is a possibility that the numerical data includes very small values such as "0.02" or "0.05" in a non-negligible percentage. When the periodicity is detected from such numerical data, the above-mentioned very small numerical values can be regarded as the noise. When such numerical values cannot be regarded as the periodic component, the input data conversion unit 47 excludes such numerical values. Therefore, the periodicity can be detected with a high degree of accuracy.

The present invention will be described below by using a specific example. However, the scope of the present invention is not limited to a content described below. In the specific example, in order to monitor the periodicity of a packet transmitted and received via a communication network, a packet monitor system including the periodicity detection device 3 according to the third exemplary embodiment will be described as a device for detecting the periodicity.

Figure 11:
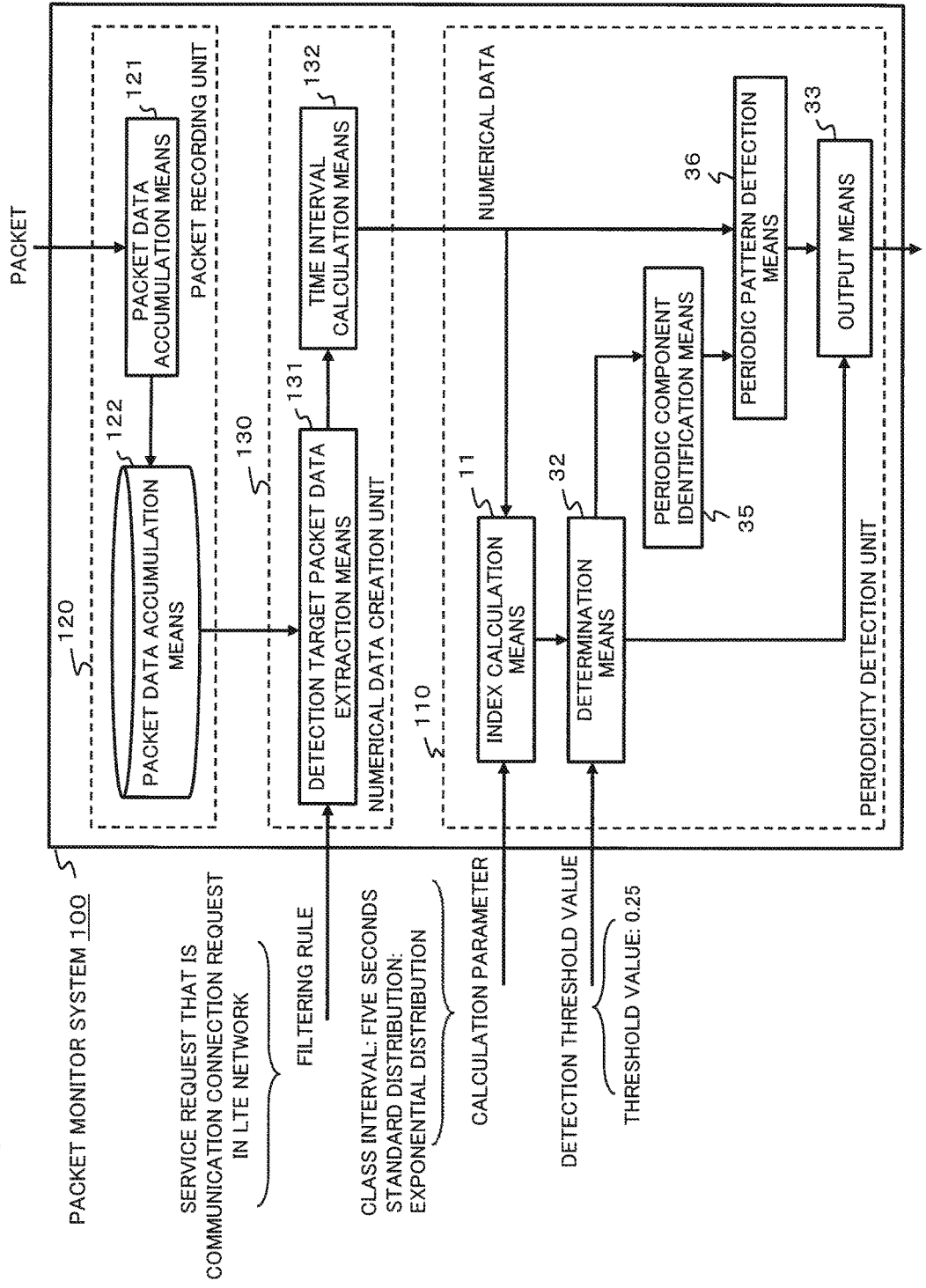
FIG. 11 is a block diagram showing an example of configuration of a packet monitor system.

FIG. 11 is a block diagram showing an example of configuration of the packet monitor system using the periodicity detection device of the present invention. A packet monitor system 100 according to the specific example includes a packet recording unit 120, a numerical data generation unit 130, and a periodicity detection unit 110. The packet recording unit 120 and the numerical data generation unit 130 are connected to each other so as to be communicable and the numerical data generation unit 130 and the periodicity detection unit 110 are connected to each other so as to be communicable.

The periodicity detection unit 110 corresponds to the periodicity detection device 3 according to the third exemplary embodiment. Namely, the packet monitor system 100 includes the packet recording unit 120 and the numerical data generation unit 130. This is a difference between the periodicity detection device 3 according to the third exemplary embodiment and the packet monitor system 100. The configuration of the periodicity detection unit 110 of the packet monitor system 100 is the same as the configuration of the periodicity detection device 3 according to the third exemplary embodiment. The same reference numbers are used for the elements having the same function as the third exemplary embodiment shown in FIG. 7 and the description of the element is omitted.

The packet recording unit 120 includes a packet acquisition unit 121 and a packet data accumulation unit 122. The packet acquisition unit 121 is connected to the packet data accumulation unit 122.

The packet acquisition unit 121 receives the packet input from the external device (not shown). The packet acquisition unit 121 generates the packet data including time information associated with at least each packet and information which enables the classification of communication and outputs the generated packet data to the packet data accumulation unit 122.

The packet acquisition unit 111 may perform a process for storing a time at which the packet is received or receive the time information recorded in the external device equipped with a unit for acquiring time information associated with each packet simultaneously when the packet is received.

For example, the "information which enables the classification of communication" is the reproduction of the received packet or header information including a destination IP address, a transmission source IP address, a destination TCP port number, a transmission source TCP port number, or a flag indicating that the packet is a specific one.

The packet acquisition unit 121 may operate only at a specific time or always operate in order to perform monitoring in real time.

The packet data accumulation unit 122 receives the packet data from the packet acquisition unit 121 and stores the received packet data in an order of reception. Further, the packet data accumulation unit 122 takes out the packet data in response to a request from detection target packet data extraction unit 131 described below and outputs the packet data to the request source.

The numerical data generation unit 130 includes the detection target packet data extraction unit 131 and time interval calculation unit 132. The detection target packet data extraction unit 131 is connected to the time interval calculation unit 132.

The detection target packet data extraction unit 131 requests the packet data from the packet data accumulation unit 122. Further, the detection target packet data extraction unit 131 receives the input of a predetermined filtering rule from the external device (not shown), extracts the packet data (hereinafter, referred to as "detection target packet data") that is the detection target from the packet data according to the filtering rule, and outputs it to the time interval calculation unit 132.

Here, the filtering rule is a rule for narrowing down the packet data that is the target for detecting the periodicity among the packet data received from the packet data accumulation unit 122. Since the filtering rule is not limited in particular, an arbitrary rule may be applied as the filtering rule according to the purpose.

For example, a method in which a single IP address is assigned may be applied as the filtering rule in order to detect the periodicity that exists in the packet transmitted and received between a certain client and a server. In addition, in a case in which the packet is transmitted and received between a plurality of servers in the communication between the client and the server in order to detect load dispersion, a method in which a plurality of IP addresses are assigned to detect the periodicity that exists in the packet may be applied as the filtering rule. For example, the technique of the DNS (Domain Name System) round robin or the like is used as a technique for realizing the load dispersion in the communication between the client and the server.

A flag in the header information indicating the packet that has a specific role such as TCP syn or Service Request in the LTE (Long Term Evolution) may be designated in the filtering rule. However, these are shown as an example. A single rule in which another header information or information included in the packet is designated may be applied or a plurality of rules may be applied simultaneously as the filtering rule.

The time interval calculation unit 132 receives the detection target packet data from the detection target packet data extraction unit 131. The time interval calculation unit 132 generates the time interval data of two consecutive packets by calculating a difference between time information associated with each packet and time information associated with the packet positioned before one of each packet with respect to the packet data enumerated in chronological order.

In the time interval data generated by the time interval calculation unit 132, as shown in FIG. 2, for example, at least the value indicating the time interval represented in seconds or in minutes is enumerated. After that, the time interval calculation unit 132 outputs the generated time interval data to the periodicity detection unit 110 as the numerical data used for the detection of the periodicity.

The packet recording unit 120 is a computer and includes at least the CPU, the memory, and the network interface. The packet recording unit 120 includes at least one of an external storage device which can read/write data from/into a magnetic disk such as a flexible disc or a CD/DVD-ROM and an internal storage (a magnetic storage device).

The packet recording unit 120 loads a program code received from the network interface or a program code read from the storage or the external storage device into the memory. The packet recording unit 120 performs functions as the packet acquisition unit 121 and the packet data accumulation unit 122 as shown in FIG. 11 when the CPU interprets the stored program code and executes it.

The numerical data generation unit 130 is a computer, includes at least the CPU and the memory, and includes at least one of the network interface, the external storage device which can read/write data from/into a magnetic disk such as a flexible disc or a CD/DVD-ROM, and the internal storage.

The numerical data generation unit 130 loads the program code received from the network interface or the program code read from the storage or the external storage device into the memory. The numerical data generation unit 130 realizes functions as the detection target packet data extraction unit 131 and the time interval calculation unit 132 as shown in FIG. 11 when the CPU interprets the stored program code and executes it.

The periodicity detection unit 110 is a computer, includes at least the CPU and the memory, and includes at least one of the network interface, the external storage device which can read/write data from/into a magnetic disk such as a flexible disc or a CD/DVD-ROM, and the internal storage.

The periodicity detection unit 110 loads the program code received from the network interface or the program code read from the storage or the external storage device into the memory. The periodicity detection unit 110 realizes functions as the index calculation unit 11, the determination unit 32, the output unit 33, the periodic component identification unit 35, and the periodic pattern detection unit 36 as shown in FIG. 11 when the CPU interprets the stored program code and executes it.

In this specific example, the packet monitor system 100 equipped with the packet recording unit 120, the numerical data generation unit 130, and the periodicity detection unit 110 is a computer resource such as a so-called personal computer (PC) or a server.

When the packet recording unit 120, the numerical data generation unit 130, and the periodicity detection unit 110 are constructed on physically different computer resources and each of these units includes a network interface, the packet recording unit 120, the numerical data generation unit 130, and the periodicity detection unit 110 may be connected to each other through the network interface.

The specific example is an example showing a case in which the packet data which can be acquired under an environment of the LTE network that is a mobile network is input to the packet monitor system 100 and the periodicity is detected with respect to the observed time interval between the packets.

In the specific example, it is assumed that the filtering rule input to the detection target packet data extraction unit 131 is a rule in which the packet of Service Request that is a communication connection request of the LTE network is extracted. In addition, in the specific example, it is assumed that in the calculation parameter input to the index calculation unit 11, the class interval width is five seconds, the standard distribution is the exponential distribution, and the detection threshold input to the determination unit 32 is 0.25.

Figure 12:
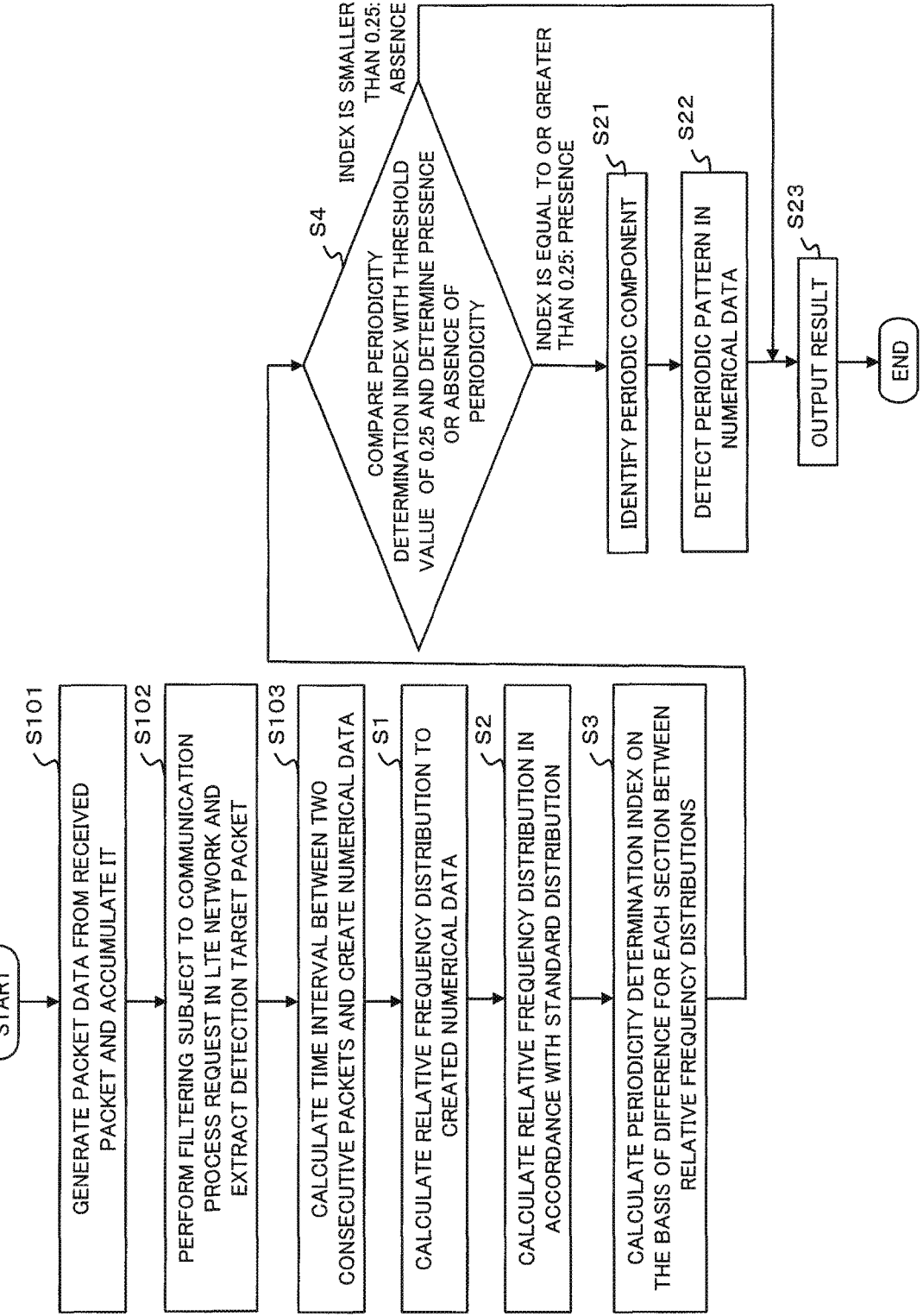
FIG. 12 is a flowchart showing an example of operation of a packet monitor system 100 according to a specific example.

FIG. 12 is a flowchart showing an example of the operation of the packet monitor system 100 in the specific example. The packet acquisition unit 121 receives the input of the packet from the external device (not shown) and generates the packet data including at least the time information associated with each packet and the information which enables the classification of communication on the basis of the received packet. The packet acquisition unit 121 notifies the packet data accumulation unit 122 of the generated packet data and the packet data accumulation unit 122 accumulates the received packet data (step S101).

The detection target packet data extraction unit 131 receives the stored packet data by requesting the packet data accumulation unit 122 to output the packet data and thereby. The detection target packet data extraction unit 131 receives the filtering rule by which the packet of Service Request that is a communication connection request of the LTE network is extracted from the external device (not shown). The detection target packet data extraction unit 131 extracts the packet data that is the target for detecting the periodicity from the received packet data according to the received filtering rule and output it to the time interval calculation unit 132 (step S102).

The time interval calculation unit 132 generates the time interval data as shown in a part of FIG. 2, by receiving the detection target packet data from the detection target packet data extraction unit 131 and calculating the time interval of two consecutive packets. The time interval calculation unit 132 outputs the generated time interval data as the numerical data to the index calculation unit 11 and the periodic pattern detection unit 36 (step S103).

The index calculation unit 11 receives the input of the numerical data from the time interval calculation unit 132. Further, the index calculation unit 11 receives the calculation parameter for calculating the periodicity determination index from the external device (not shown), sets the class interval width of the frequency distribution that is set to the calculation parameter to 5 seconds, and calculates the relative frequency distribution of the input numerical data (step S1).

The index calculation unit 11 refers to the exponential distribution set as the predetermined standard distribution in the calculation parameter, sets the class interval width to 5 seconds, and calculates the relative frequency distribution in accordance with the exponential distribution whose average is equal to the average of the numerical data (step S2).

Figure 13:
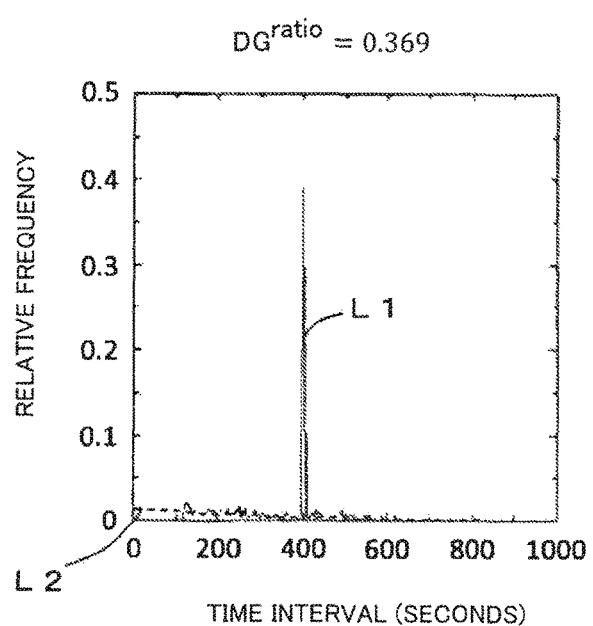
FIG. 13 is an explanatory diagram showing an example of a relative frequency distribution.

FIG. 13 is an explanatory diagram showing an example of the relative frequency distribution. The relative frequency distribution shown in FIG. 13 as an example is calculated by the processes from step S101 to step S2. In FIG. 13, a solid line L1 indicates the relative frequency distribution of the numerical data. In addition, a dashed line L2 indicates the relative frequency distribution in accordance with the exponential distribution.

Next, the index calculation unit 11 compares the relative frequency distribution of the numerical data with the relative frequency distribution in accordance with the exponential distribution and calculates the periodicity determination index by dividing the maximum value of the difference obtained for each section between the relative frequency distributions by the sum of the differences in the entire relative frequency distribution as shown in the definition formula shown in FIG. 3. Here, the periodicity determination index is calculated as 0.369. The index calculation unit 11 outputs the calculated periodicity determination index to the determination unit 32 (step S3).

According to the definition formula shown in FIG. 3, when i=∞ (infinite), the cumulative frequency of the exponential distribution is equal to 1. Therefore, in the calculation of the periodicity determination index, the section positioned at infinity needs to be taken into consideration. However, in this specific example, the periodicity determination index is calculated under the following conditions. The cumulative frequency of the relative frequency distribution of the numerical data is 1 and the calculation is performed up to the section in which the cumulative frequency in the relative frequency distribution in accordance with the exponential distribution that is the standard distribution is equal to 0.98.

The determination unit 32 receives the calculated periodicity determination index (0.369) from the index calculation unit 11. The determination unit 32 receives the input of the detection threshold (set to 0.25) as the standard for determining the presence or absence of the periodicity from the external device (not shown). The determination unit 32 compares the periodicity determination index (0.369) with the detection threshold (0.25) and determines whether or not the numerical data has the periodicity (step S4).

Since the periodicity determination index (0.369) is greater than the detection threshold (0.25), the determination unit 32 determines that the numerical data has the periodicity (a case in which "index is equal to or greater than 0.25: presence" in step S4) and outputs information indicating that the numerical data has the periodicity to the periodic component identification unit 35. Further, when the periodicity determination index is smaller than the detection threshold (0.25), the determination unit 32 determines that the numerical data does not have the periodicity (a case in which "index is smaller than 0.25: absence" in step S4) and does not perform the processes of steps S21 and S22.

The periodic component identification unit 35 receives the information indicating that the numerical data has the periodicity from the determination unit 32. The periodic component identification unit 35 calculates the difference for each section by using the relative frequency distribution used when the index calculation unit 11 calculates the periodicity determination index. The periodic component identification unit 35 identifies the section in which the value obtained by dividing the difference for each section by the sum of the differences in the entire relative frequency distribution is the maximum. As shown in FIG. 13, the periodic component identification unit 35 identifies the section from 400 seconds to 405 seconds as the periodic component and outputs information of the identified periodic component to the periodic pattern detection unit 36 (step S21).

The periodic pattern detection unit 36 identifies a part in which the same periodic component continuously and repeatedly appears as the periodic pattern on the basis of the information of the periodic component (from 400 seconds to 405 seconds) received from the periodic component identification unit 35. By applying this method, the periodic pattern detection unit 36 extracts the periodic pattern of which the time interval from 400 seconds to 405 seconds is repeatedly generated and notifies the output unit 33 of the extracted result (step S22).

The output unit 33 receives the periodic pattern of which the time interval from 400 seconds to 405 seconds is repeatedly generated that is extracted by the periodic pattern detection unit 36 and outputs information of the periodic pattern. Here, the output unit 33 outputs the number of times of appearance to the external device (not shown) as the information of the periodic pattern, for example, when the number of times of continuous appearance of the time interval of about 400 seconds in the numerical data is three or more (step S23).

Figure 14:
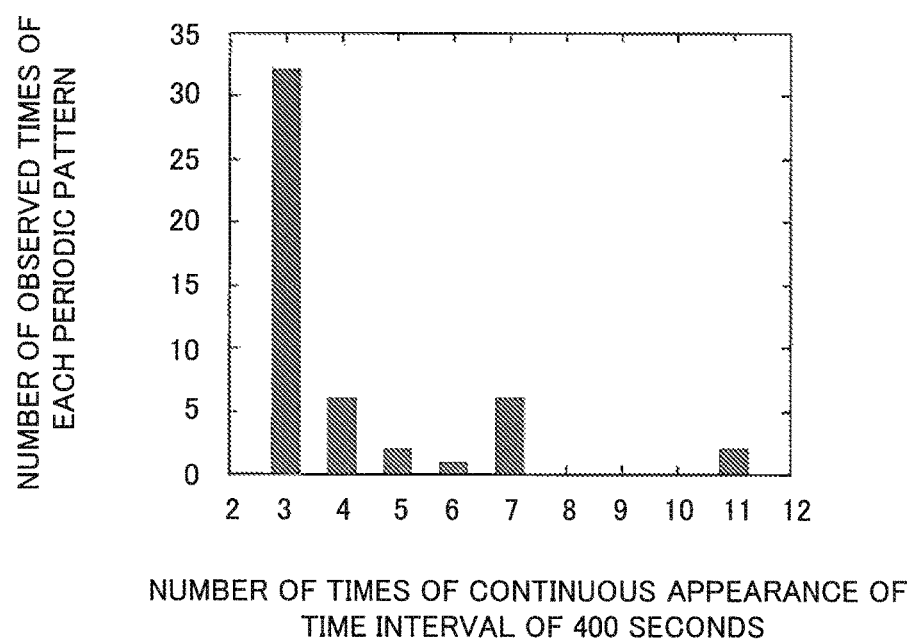
FIG. 14 is an explanatory diagram showing an example of a result output by a packet monitor system 100 according to a specific example.

FIG. 14 shows a graph of histogram in which the vertical axis gives the number of observed times of the periodic pattern in the numerical data and the horizontal axis gives the number of times of continuous appearance of the time interval of about 400 seconds with respect to the result output by the output unit 33. From FIG. 14, it is seen that the packets are generated in the numerical data in the time interval of about 400 seconds maximum 11 times continuously and the maximum observation times of the repeating pattern is three.

As described above, according to the specific example, in the packet monitor system 100 (more specifically, the periodicity detection unit 110), the index calculation unit 11 generates two relative frequency distributions: the relative frequency distribution of the numerical data that is the time interval data generated from the detection target packet data and the relative frequency distribution in accordance with the exponential distribution that is the standard distribution. The index calculation unit 11 calculates the periodicity determination index by dividing the maximum value of the difference obtained for each section between the relative frequency distributions by the sum of the differences in the entire relative frequency distribution. As a result, the determination unit 32 determines whether or not the numerical data has the periodicity.

Since the index calculation unit 11 performs the calculation process on the basis of the relative frequency distribution, the index calculation unit 11 can calculate the coordinate position in one-dimensional space for each element of the numerical data and calculate the index by only referring to the calculated coordinate position for each element of the numerical data one time. Therefore, it is not necessary to repeatedly perform the process. As a result, the calculation amount for determine the presence or absence of the periodicity can be reduced.

In the packet monitor system 100 (more specifically, the periodicity detection unit 110) according to the present invention, the periodic component identification unit 35 uses the relative frequency distribution that is the same as the relative frequency distribution used when the index calculation unit 11 calculates the periodicity determination index in common. As a result, since the calculation process performed by the index calculation unit 11 and the calculation process performed by the periodic component identification unit 35 can be performed at the same time. Therefore, the calculation amount can be reduced.

In the packet monitor system 100 according to the specific example, since the periodicity detection unit 110 detects the periodic component on the basis of the numerical data indicative of the time interval, the periodicity can be detected by using only information of the time interval between two consecutive packets without depending on a type of the packet and information held by the packet.

In the packet monitor system 100 according to the specific example, the periodicity detection unit 110 outputs the information of the periodic pattern indicating the result showing that the packet is generated in the time interval of about 400 seconds maximum 11 times continuously. Therefore, the packet generated at a cycle of about 400 seconds can be easily identified among the packets of Service Request extracted by the filtering rule.

Figure 15:
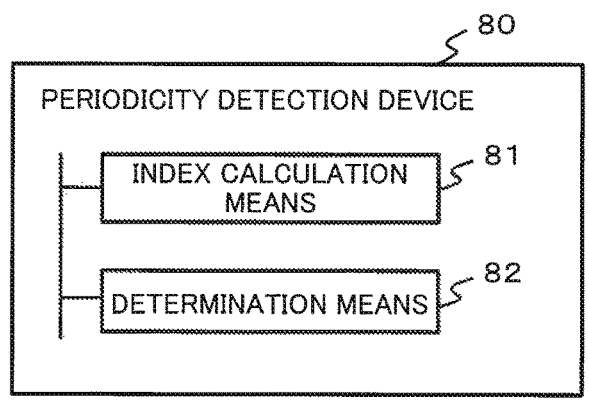
FIG. 15 is a block diagram showing an outline of a periodicity detection device according to the present invention.

Next, the outline of the present invention will be described. FIG. 15 is a block diagram showing the outline of the periodicity detection device according to the present invention. A periodicity detection device 80 according to the present invention includes an index calculation unit 81 (for example, the index calculation unit 11) which calculates the periodicity determination index for determining the presence or absence of the periodicity on the basis of the difference between the frequency distribution (for example, relative frequency distribution) of the input numerical data and the frequency distribution (for example, the relative frequency distribution) in accordance with the predetermined reference distribution (for example, the index distribution) in each section, and a determination unit 82 (for example, the determination unit 12) which determines the presence or absence of the periodicity including one or a plurality of periodic components present in the numerical data by using the periodicity determination index calculated by the index calculation unit 81.

Specifically, the index calculation unit 81 calculates the index for determining the presence or absence of the periodicity on the basis of the difference between the frequency distribution of the input numerical data and the frequency distribution in accordance with the standard distribution that is expected with respect to the input numerical data in each section.

By such configuration, it can be detected whether or not the numerical data has the periodicity without increasing the calculation amount. This is because the index calculation unit 81 performs the calculation process on the basis of the frequency distribution and whereby, the index calculation unit 81 can calculate the coordinate position in one-dimensional space for each element of the numerical data and calculate the index by only referring to the calculated coordinate position for each element of the numerical data one time.

Figure 16:
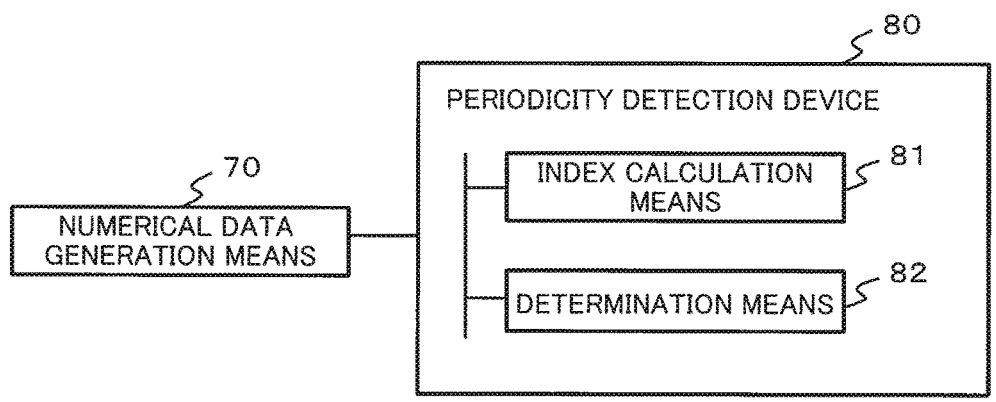
FIG. 16 is a block diagram showing an outline of a packet monitor system according to the present invention.

FIG. 16 is a block diagram showing the outline of the packet monitor system according to the present invention. The packet monitor system according to the present invention includes a numerical data generation unit 70 (for example, the numerical data generation unit 130) which extracts the packet data to be detected from the packet data enumerated in chronological order and generates a time interval between two consecutive packet data arranged in chronological order as the numerical data, and the periodicity detection device 80 (for example, the periodicity detection unit 110) which detects whether or not the numerical data has the periodicity. The configuration of the periodicity detection device 80 is similar to the configuration shown in FIG. 15. Even when such configuration is used, it can be detected whether or not the numerical data has the periodicity without increasing a calculation amount.

A part or all of the above-mentioned exemplary embodiment can be described as the following supplementary note. However, the present invention is not limited to the following supplementary note.

(Supplementary note 1) A periodicity detection method, includes:

an index calculation step which calculates a periodicity determination index for determining a presence or absence of periodicity on the basis of a difference between a frequency distribution of input numerical data and a frequency distribution in accordance with a predetermined standard distribution in each section; and a determination step which determines the presence or absence of the periodicity including one or more periodical components present in the numerical data using the periodicity determination index calculated in the index calculation step.

(Supplementary note 2) The periodicity detection method according to supplementary note 1, wherein the index calculation step calculates the periodicity determination index by comparing the frequency distribution of the input numerical data with the predetermined standard distribution and dividing a maximum value of differences calculated with respect to the each section of relative frequency distributions by a sum of the differences throughout the entire relative frequency distribution.

(Supplementary note 3) The periodicity detection method according to supplementary note 1 or 2, wherein the determination step compares a detection threshold as a reference for determining the presence or absence of the periodicity with the periodicity determination index calculated in the index calculation step, and determines the presence or absence of the periodicity including the one or more periodical components in the input numerical data.

(Supplementary note 4) The periodicity detection method according to supplementary note 3, further including a threshold determination step which generates pseudo-numerical data by synthesizing the numerical data indicative of one or more periodic components and the standard distribution, calculates a tentative index to the generated pseudo-numerical data by using the same manner as a manner to calculate the periodicity determination index in the index calculation step, and determines the detection threshold by multiplying a value of the tentative index by a predetermined ratio.

(Supplementary note 5) The periodicity detection method according to any one of supplementary note 1 to 4, further including a periodic component identification step which identifies the one or more periodic components from the numerical data whose periodicity is determined in the determination step.

(Supplementary note 6) The periodicity detection method according to supplementary note 5, wherein the periodic component identification step compares the frequency distribution of the input numerical data with the frequency distribution in accordance with the predetermined standard distribution, identifies the maximum value of the difference between the frequency distributions for each section, and identifies the section in which the difference is maximum as the section including the periodic component.

(Supplementary note 7) The periodicity detection method according to supplementary note 6, wherein the periodic component identification step identifies a plurality of periodic components by repeatedly performing a process for generating a new frequency distribution in which the difference in the section including the periodic component is made zero, a process for calculating the periodicity determination index by dividing the maximum value of the difference calculated for each section of the generated frequency distribution by the sum of the differences in the entire frequency distribution, and a process for comparing the detection threshold with the calculated periodicity determination index and determining the presence or absence of the periodicity including the periodic component while it is determined that the periodicity exists.

(Supplementary note 8) The periodicity detection method according to supplementary note 5, wherein the periodic component identification step identifies one or a plurality of sections in which an appearance frequency is greater than a predetermined frequency by using the frequency distribution of the input numerical data as the periodic component.

(Supplementary note 9) The periodicity detection method according to supplementary note 5 wherein the periodic component identification step identifies one or a plurality of sections in which the difference calculated for each section between the frequency distribution of the input numerical data and the frequency distribution in accordance with the predetermined standard distribution is greater than a predetermined first threshold as the section including the periodic component.

(Supplementary note 10) The periodicity detection method according to supplementary note 5 wherein the periodic component identification step compares the frequency distribution of the input numerical data with the frequency distribution in accordance with the predetermined standard distribution, calculates a section determination index for determining the section by dividing the difference calculated for each section between the frequency distributions by the sum of the differences in the entire frequency distribution, and identifies one or a plurality of sections in which the section determination index is greater than a predetermined second threshold as the section including the periodic component.

(Supplementary note 11) The periodicity detection method according to supplementary note 10 wherein the periodic component identification step generates pseudo-numerical data by synthesizing the numerical data indicating one or a plurality of periodic components and the standard distribution, and calculates the tentative index to the generated pseudo-numerical data by using the same manner as a manner to calculate the periodicity determination index in the index calculation step, and determines a second threshold by multiplying the value of the calculated tentative index by a predetermined ratio.

(Supplementary note 12) The periodicity detection method according to any one of supplementary note 1 to 11, further including an input data conversion step which eliminates, in a case where the input numerical data includes a numerical value not having to count as the periodic component to be detected, the numerical value from the input numerical data.

(Supplementary note 13) The periodicity detection method according to any one of supplementary note 1 to 12, wherein the index calculation step calculates an index for determining the presence or absence of periodicity on the basis of differences between the frequency distribution of the input numerical data and a frequency distribution in accordance with a standard distribution assumed with respect to the input numerical data in the each section.

(Supplementary note 14) A periodicity detection device, includes:

an index calculation unit which calculates a periodicity determination index for determining a presence or absence of periodicity on the basis of a difference between a frequency distribution of input numerical data and a frequency distribution in accordance with a predetermined standard distribution in each section; and a determination unit which determines the presence or absence of the periodicity including one or more periodical components present in the numerical data using the periodicity determination index calculated by the index calculation unit.

(Supplementary note 15) The periodicity detection device according to supplementary note 14, wherein the index calculation unit calculates the periodicity determination index by comparing the frequency distribution of the input numerical data with the predetermined standard distribution and dividing a maximum value of differences calculated with respect to the each section of relative frequency distributions by a sum of the differences throughout the entire relative frequency distribution.

(Supplementary note 16) The periodicity detection device according to supplementary note 14 or 15, wherein the determination unit compares a detection threshold as a reference for determining the presence or absence of the periodicity with the periodicity determination index calculated by the index calculation unit, and determines the presence or absence of the periodicity including the one or more periodical components in the input numerical data.

(Supplementary note 17) The periodicity detection device according to supplementary note 16, further including a threshold determination unit which generates pseudo-numerical data by synthesizing the numerical data indicative of one or more periodic components and the standard distribution, calculates a tentative index to the generated pseudo-numerical data by using the same manner as a manner to calculate the periodicity determination index in the index calculation unit, and determines the detection threshold by multiplying a value of the tentative index by a predetermined ratio.

(Supplementary note 18) The periodicity detection device according to any one of supplementary note 14 to 17, further including a periodic component identification unit which identifies the one or more periodic components from the numerical data whose periodicity is determined by the determination unit.

(Supplementary note 19) The periodicity detection device according to supplementary note 18, wherein the periodic component identification unit compares the frequency distribution of the input numerical data with the frequency distribution in accordance with the predetermined standard distribution, identifies the maximum value of the difference between the frequency distributions for each section, and identifies the section in which the difference is maximum as the section including the periodic component.

(Supplementary note 20) The periodicity detection device according to supplementary note 19, wherein the periodic component identification unit identifies a plurality of periodic components by repeatedly performing a process for generating a new frequency distribution in which the difference in the section including the periodic component is made zero, a process for calculating the periodicity determination index by dividing the maximum value of the difference calculated for each section of the generated frequency distribution by the sum of the differences in the entire frequency distribution, and a process for comparing the detection threshold with the calculated periodicity determination index and determining the presence or absence of the periodicity including the periodic component while it is determined that the periodicity exists.

(Supplementary note 21) The periodicity detection device according to supplementary note 18, wherein the periodic component identification unit identifies one or a plurality of sections in which an appearance frequency is greater than a predetermined frequency by using the frequency distribution of the input numerical data as the periodic component.

(Supplementary note 22) The periodicity detection device according to supplementary note 18 wherein the periodic component identification unit identifies one or a plurality of sections in which the difference calculated for each section between the frequency distribution of the input numerical data and the frequency distribution in accordance with the predetermined standard distribution is greater than a predetermined first threshold as the section including the periodic component.

(Supplementary note 23) The periodicity detection device according to supplementary note 18 wherein the periodic component identification unit compares the frequency distribution of the input numerical data with the frequency distribution in accordance with the predetermined standard distribution, calculates a section determination index for determining the section by dividing the difference calculated for each section between the frequency distributions by the sum of the differences in the entire frequency distribution, and identifies one or a plurality of sections in which the section determination index is greater than a predetermined second threshold as the section including the periodic component.

(Supplementary note 24) The periodicity detection device according to supplementary note 23 wherein the periodic component identification unit generates pseudo-numerical data by synthesizing the numerical data indicating one or a plurality of periodic components and the standard distribution, and calculates the tentative index to the generated pseudo-numerical data by using the same manner as a manner to calculate the periodicity determination index in the index calculation unit, and determines a second threshold by multiplying the value of the calculated tentative index by a predetermined-ratio.

(Supplementary note 25) The periodicity detection device according to any one of supplementary note 14 to 24, further including an input data conversion unit which eliminates, in a case where the input numerical data includes a numerical value not having to count as the periodic component to be detected, the numerical value from the input numerical data.

(Supplementary note 26) The periodicity detection device according to any one of supplementary note 14 to 25, wherein the index calculation unit calculates an index for determining the presence or absence of periodicity on the basis of differences between the frequency distribution of the input numerical data and a frequency distribution in accordance with a standard distribution assumed with respect to the input numerical data in the each section.

(Supplementary note 27) A packet monitor system, inclues:

numerical data generation unit which extracts packet data to be detected from packet data enumerated in chronological order and generates numerical data indicative of a time interval between temporally consecutive packet data; and a periodicity detection device which detects a presence or absence of periodicity in the numerical data, wherein the periodicity detection device comprising:

index calculation unit which calculates a periodicity determination index for determining the presence or absence of the periodicity on the basis of a difference between a frequency distribution of the numerical data and a frequency distribution in accordance with a predetermined standard distribution in each section; and determination unit which determines the presence or absence of the periodicity including one or more periodical components present in the numerical data using the periodicity determination index calculated by the index calculation unit.

(Supplementary note 28) A periodicity detection program which causes a computer to perform:

an index calculation process which calculates a periodicity determination index for determining a presence or absence of periodicity on the basis of a difference between a frequency distribution of input numerical data and a frequency distribution in accordance with a predetermined standard distribution in each section; and a determination process which determines the presence or absence of the periodicity including one or more periodical components present in the numerical data using the periodicity determination index calculated in the index calculation process.

(Supplementary note 29) The periodicity detection program according to supplementary note 28 wherein the index calculation process calculates the periodicity determination index by comparing the frequency distribution of the input numerical data with the predetermined standard distribution and dividing a maximum value of differences calculated with respect to the each section of relative frequency distributions by a sum of the differences throughout the entire relative frequency distribution.

While the invention has been particularly shown and described with reference to exemplary embodiment thereof, the invention is not limited to these embodiments. It will be understood by those of ordinary skill in the art that various changes in form and details may be made therein without departing from the spirit and scope of the present invention as defined by claims.

The present invention is suitably applied to the periodicity detection device which detects the periodicity present in numerical data with arbitrary format.

INDUSTRIAL APPLICABILITY

This application claims priority from Japanese Patent Application No. 2013-038677 filed on Feb. 28, 2013, the disclosure of which is hereby incorporated by reference in its entirety.

REFERENCE SIGNS LIST 1, 2, 3, and 4 periodicity detection device
11 index calculation unit
12 and 32 determination unit
13 and 33 output unit
24 detection threshold determination unit
35 periodic component identification unit
36 periodic pattern detection unit
47 input data conversion unit
100 packet monitor system
110 periodicity detection unit
120 packet recording unit
130 numerical data generation unit
121 packet acquisition unit
122 packet data accumulation unit
131 detection target packet data extraction unit
132 time interval calculation unit

The invention claimed is:

1. A periodicity detection method, comprising:
calculating, by a periodicity detection device, a periodicity determination index for determining a presence or absence of periodicity on a basis of a difference between a frequency distribution of input numerical data and a frequency distribution in accordance with a predetermined standard distribution in each section; and
determining, by the periodicity detection device, the presence or absence of the periodicity including one or more periodical components present in the numerical data, using the calculated periodicity determination index.

2. The periodicity detection method according to claim 1, wherein the calculating calculates the periodicity determination index by comparing the frequency distribution of the input numerical data with the predetermined standard distribution and dividing a maximum value of differences calculated with respect to the each section of relative frequency distributions by a sum of differences throughout an entire relative frequency distribution.

3. The periodicity detection method according to claim 1, wherein the determining compares a detection threshold as a reference for determining the presence or absence of the periodicity with the calculated periodicity determination index and determines the presence or absence of the periodicity including the one or more periodical components in the input numerical data.

4. The periodicity detection method according to claim 3, further comprising:
generating, by the periodicity detection device, pseudo-numerical data by synthesizing numerical data indicative of one or more periodic components and the standard distribution;
calculating, by the periodicity detection device, a tentative index to the generated pseudo-numerical data by using a same manner as a manner to calculate the periodicity determination index; and
determining, by the periodicity detection device, the detection threshold by multiplying a value of the tentative index by a predetermined ratio.

5. The periodicity detection method according to claim 1, further comprising identifying, by the periodicity detection device, the one or more periodic components from the numerical data whose periodicity is determined.

6. The periodicity detection method according to claim 1, further comprising eliminating, by the periodicity detection device and in a case where the input numerical data includes a numerical value not having to count as the periodic component to be detected, the numerical value from the input numerical data.

7. The periodicity detection method according to claim 1, wherein the reference distribution comprises a reference distribution assumed with respect to the input numerical data.

8. The periodicity detection method according to claim 1, wherein the periodicity detection device comprises:
a computer; and
a memory device,
wherein the computer comprises a Central Processing Unit (CPU) for implementing the periodicity detection device as a set of machine-readable instructions stored in the memory device as a program to selectively be executed by the CPU.

9. A periodicity detection device, comprising:
an index calculation unit which calculates a periodicity determination index for determining a presence or absence of periodicity on a basis of a difference between a frequency distribution of input numerical data and a frequency distribution in accordance with a predetermined standard distribution in each section; and a determination unit which determines the presence or absence of the periodicity including one or more periodical components present in the numerical data, using the periodicity determination index calculated by the index calculation unit.

10. The periodicity detection device according to claim 9, wherein the periodicity detection device comprises:
a computer; and
a memory device,
wherein the computer comprises a Central Processing Unit (CPU) for implementing the index calculation unit and the determination unit as a set of machine-readable instructions stored in the memory device as a program to selectively be executed by the CPU.

11. A packet monitor system, comprising:
a numerical data generation unit which extracts packet data to be detected from packet data enumerated in chronological order and generates numerical data indicative of a time interval between temporally consecutive packet data; and
a periodicity detection device which detects a presence or absence of periodicity in the numerical data,
wherein the periodicity detection device comprises:
an index calculation unit which calculates a periodicity determination index for determining the presence or absence of the periodicity on a basis of a difference between a frequency distribution of the numerical data and a frequency distribution in accordance with a predetermined standard distribution in each section; and
a determination unit which determines the presence or absence of the periodicity including one or more periodical components present in the numerical data, using the periodicity determination index calculated by the index calculation unit.

12. The packet monitor system according to claim 11, as comprising:
a computer; and
a memory device,
wherein the computer comprises a Central Processing Unit (CPU) for implementing the numerical data generation unit and the periodicity detection unit as a set of machine-readable instructions stored in the memory device as a program to selectively be executed by the CPU.

13. A non-transitory computer-readable storage medium recording thereon a periodicity detection program which causes a computer to perform:
an index calculation process which calculates a periodicity determination index for determining a presence or absence of periodicity on a basis of a difference between a frequency distribution of input numerical data and a frequency distribution in accordance with a predetermined standard distribution in each section; and
a determination process which determines the presence or absence of the periodicity including one or more periodical components present in the numerical data, using the periodicity determination index calculated in the index calculation process.

* * * * *